(12) United States Patent
Nagamune

(10) Patent No.: US 7,670,027 B2
(45) Date of Patent: Mar. 2, 2010

(54) LASER ILLUMINATOR

(75) Inventor: Yasushi Nagamune, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 132 days.

(21) Appl. No.: 11/698,918

(22) Filed: Jan. 29, 2007

(65) Prior Publication Data
US 2007/0274075 A1 Nov. 29, 2007

(30) Foreign Application Priority Data
Jan. 31, 2006 (JP) .............................. 2006-021888

(51) Int. Cl.
*G02B 27/18* (2006.01)
(52) U.S. Cl. .................... 362/259; 362/268; 362/284
(58) Field of Classification Search ................ 362/259, 362/268, 282, 284, 322, 324, 328, 341, 351; 359/214, 215
See application file for complete search history.

(56) References Cited

U.S. PATENT DOCUMENTS

| | | | | |
|---|---|---|---|---|
| 3,710,098 A * | 1/1973 | Walden | ...................... | 362/259 |
| 4,851,978 A * | 7/1989 | Ichihara | ...................... | 362/268 |
| 4,948,253 A * | 8/1990 | Biegen | ........................ | 359/214 |
| 5,535,230 A * | 7/1996 | Abe | ............................ | 362/259 |
| 5,631,754 A * | 5/1997 | Jannson et al. | .............. | 359/599 |
| 6,952,435 B2 * | 10/2005 | Lai et al. | .................... | 359/214 |
| 7,350,945 B2 * | 4/2008 | Albou et al. | ................ | 362/259 |
| 2005/0207160 A1 * | 9/2005 | Babayoff et al. | ............ | 362/259 |

FOREIGN PATENT DOCUMENTS

| | | |
|---|---|---|
| JP | 5-217854 A | 8/1993 |
| JP | 5-275317 A | 10/1993 |
| JP | 6-167640 A | 6/1994 |
| JP | 9-6011 A | 1/1997 |
| JP | 9-159964 A | 6/1997 |
| JP | 11-101925 A | 4/1999 |
| JP | 2000-221332 A | 8/2000 |

OTHER PUBLICATIONS

Gerritsen et al., Applied Optics, vol. 7, No. 11, pp. 2301-2311, (1968).
Brandt, G. B., Applied Optics, vol. 12, No. 2, pp. 368-372, (1973).
Lowenthal et al., Journal of the Optical Society of America, vol. 61, No. 7, pp. 847-851, (1971).
Ih, C. S., Applied Optics, vol. 17, No. 9, pp. 1447-1454, (1978).

* cited by examiner

*Primary Examiner*—Y My Quach Lee
(74) *Attorney, Agent, or Firm*—Birch, Stewart, Kolasch & Birch, LLP

(57) ABSTRACT

A laser illuminator comprising at least one optical diffusion means capable of modifying an optical diffusion condition (3) and at least one optical suppression means for suppressing divergence of light (100), wherein the optical diffusion means and the optical suppression means are disposed along an optical path of a laser beam (6) radiating from a laser source and the laser beam is converted into a diffused and non-divergent light beam (6-2) for illuminating or exciting an object by passing through the optical diffusion means and the optical suppression means.

40 Claims, 13 Drawing Sheets

LASER ILLUMINATOR

TECHNICAL FIELD

The present invention relates to a laser illuminator for illuminating an object with a laser beam uniformly (equally) and brightly.

BACKGROUND OF THE RELATED ART

A laser beam has an intensity spatial distribution with respect to a plane perpendicular to the traveling direction thereof. When a laser beam is used as a light source, it is required to use a center area of the laser beam having a more uniform intensity spatial distribution or to make the un-uniform intensity spatial distribution uniform in any suitable manners.

A laser beam radiating with a multimode which has a very complicated intensity spatial distribution, can illuminate a relatively large object uniformly. However, when a relatively small object to be observed using a microscope is illuminated, a laser beam radiating with a multimode cannot be used as a proper light source as it is, because un-uniformity of the un-uniform intensity spatial distribution becomes visible.

In a laser beam, which radiates with a basic $TEM_{00}$ mode, the intensity spatial distribution of the laser beam is a Gaussian distribution. Therefore, even if the center area of the laser beam having a relatively uniform intensity spatial distribution is selectively used, the intensity spatial distribution of the selected area cannot be completely uniform and a large portion of the power of the laser beam is consumed wastefully.

When a un-uniform intensity spatial distribution of a laser beam exists, out-of-focus illumination by the laser beam may be used for uniform illumination. However, variations in intensity due to interference of the laser beam cannot be overcome absolutely.

Conventionally, there is known an illumination method using a laser beam in such a manner that a laser beam is radiated on a dispersion element, such as a diffraction grating (refer to non-patent document 1), a mesh screen (refer to non-patent document 2), or an optical diffusion plate (refer to non-patent document 3) to obtain a pseudo light source from the surface of the dispersion element for use in illumination. However, since a laser beam has a high coherence, interference noises called speckle noises occur.

It is to be understood that a phase of the laser beam is not completely disturbed at random by diffusion. A light intensity becomes extremely high at an area where the phase is accidentally in order, while the light intensity becomes zero at an area where the phase is out of order by 180°, which results in generating a spot noise of a granular pattern. This is referred to as a speckle noise.

In order to reduce the speckle noises, a laser beam is circularly rotated with respect to a dispersion element (refer to non-patent documents 1, 2 and 3) or a diffraction grating, screen mesh, or light diffusion plate is moved using a piezo element (refer to non-patent document 4) so that an object is more uniformly illuminated by changing an interference pattern. However, in this method, uniformity is not satisfactory and a large amount of light is scattered.

As an alternative method, there is proposed a method of reducing speckle noises using plural optical fibers having different lengths (refer to patent document 1). However, the bundle structure using plural optical fibers has particularly a large incident loss and the total light transmittance is at most 50%. When the structure is used at resolution power level of an optical system, a huge number of optical fibers are required, and noises cannot be removed substantially.

In contrast, there is proposed a method of combination of a plate for disturbing phase randomly and bundled optical fibers (refer to patent document 2). In this method, an effect for more randomly disturbing phase can be expected, however, total system becomes more complicated and leads to a larger loss of light amount.

There is proposed to divide a single optical fiber into plural branches on the way to realize the similar effect (patent document 3). However, dividing the optical fiber has a large reflection loss of light at the branch position although uniformity can be better.

Patent document 4 discloses an illumination system, which is provided with a sensor for detecting divergent angle of a laser beam to adjust the position of an element for changing coherence of the laser beam of many optical elements in a laser source in accordance with output of the sensor. However, a very complicated optical system and a reference light are required in this system so that the whole loss of light is very large.

A method for deforming a mirror by an actuator to improve uniformity of an intensity spatial distribution of an illumination light is proposed (refer to patent document 5). However, the apparatus is bulky and very expensive and requires delicate and complicated adjustment of optical axis.

Moreover, a method for uniformly illuminating an object using the light leaked from an optical fiber is proposed (refer to patent document 6). However, in this illumination, a high power laser is required to obtain sufficiently bright illumination, because the leaked light is weak.

A method using a prism is proposed (refer to patent document 7). In this method, an accurate oblique incidence to a prism with a high precision optical axis adjustment mechanism is required, and there is a significant reflection less by the oblique incidence. Moreover, in order to reduce the optical loss in the prism, an expensive large prism made of a high purity material equivalent to that for the optical fiber is required.

Moreover, there is known a method for reducing disturbances due to noises by capturing a large number of images at a time or in a time series, while changing the interference pattern of a light, and then averaging the images through image processing. However, in this method, much time is required for image processing and is not suitable for the purpose of real time observation.

There is another method of illumination by scanning a focused laser beam on whole area. In this method, a very complicated and expensive optical system is required for scanning a focused laser beam accurately. The complicated optical system results in a large loss of light amount. Moreover, it is difficult to realize real time observation, because it takes much time for scanning whole area.

[Non-patent document 1]
H. J. Gerritsen, W. J. Hanman and E. G. Ramberg: Appl. Opt., Vol. 7, pp. 2301-2311, 1968
[Non-patent document 2]
G. B. Brandt: Appl. Opt., Vol. 12, pp. 368-371, 1971
[Non-patent document 3]
S. Lowenthal and D. Joyeux: J. Opt. Soc.Am, Vol. 61, pp. 847-851, 1971
[Non-patent document 4]
C. S. Ih and L. A. Baxter: Appl. Opt., Vol. 17, pp. 1447-1454, 1978
[Patent document 1]
Japanese Patent laid-open publication No. Tokkaihei 06-167640

[Patent document 2]
Japanese Patent laid-open publication No. Tokkaihei 11-101925
[Patent document 3]
Japanese Patent laid-open publication No. Tokkaihei 05-217854
[Patent document 4]
Japanese Patent laid-open publication No. Tokkaihei 05-275317
[Patent document 5]
Japanese Patent laid-open publication No. Tokkaihei 09-006011
[Patent document 6]
Japanese Patent laid-open publication No. Tokkai 2000-221332
[Patent document 7]
Japanese Patent laid-open publication No. Tokkaihei 09-159964

DISCLOSURE OF THE INVENTION

The present invention is made for solving the above-mentioned problems. An object of the present invention is to provide equipment for illuminating an object uniformly and brightly by using a laser beam, while loss of light amount of the laser beam is suppressed by an optical system simplified to a maximum extent.

According to the present invention, in order to solve the above problems, there is provided a laser illuminator which will be explained hereinafter. The laser illuminator according to the present invention comprises at least one optical diffusion means capable of modifying an optical diffusion condition and at least one optical suppression means for suppressing divergence of light. The optical diffusion means and the optical suppression means for suppressing divergence of light are disposed in an optical path of a laser beam radiating from a laser source. The laser beam from the laser source is transformed into a diffused and non-divergent light beam for illuminating or exciting an object by the optical diffusion means together with the optical suppression means for suppressing divergence of light.

In the laser illuminator, the optical diffusion means is preferably made of a variable optical diffusion plate. The variable optical diffusion plate implies an optical diffusion plate which is capable changing a condition of diffusion. For example, the optical diffusion plate capable of moving (rotation, vibration and combination thereof) can be used.

In the laser illuminator, it is preferable that the optical diffusion plate is moved mechanically.

In the laser illuminator, it is preferable that the optical diffusion plate is rotated mechanically.

In the laser illuminator, it is preferable that the optical diffusion plate is vibrated mechanically.

In the laser illuminator, it is preferable that the optical diffusion plate is moved mechanically by an electromagnetic means.

In the laser illuminator, it is preferable that the optical diffusion plate is rotated mechanically by an electromagnetic means.

In the laser illuminator, it is preferable that the optical diffusion plate is vibrated mechanically by an electromagnetic means.

In the laser illuminator, it is preferable that the optical diffusion plate is rotated by a motor.

In the laser illuminator, it is preferable that the optical diffusion plate is vibrated by a motor.

In the laser illuminator, it is preferable that the optical diffusion plate is vibrated, while rotating by a motor.

In the laser illuminator, it is preferable that the optical diffusion plate is provided with a diffusion pattern on a surface or an inside of the diffusion plate (concave-convex surface of the optical diffusion plate or distribution of refraction index in the inside of the optical diffusion plate), which is variable.

In the laser illuminator, it is preferable that the optical diffusion plate is provided with a diffusion pattern on a surface or an inside of the diffusion plate, which is rotatable.

In the laser illuminator, it is preferable that the optical diffusion plate is provided with a diffusion pattern on a surface or an inside of the diffusion plate, which is vibratable.

In the laser illuminator, it is preferable that the optical diffusion plate is provided with a diffusion pattern on a surface or an inside of the diffusion plate, which is variable by an electromagnetic means.

In the laser illuminator, it is preferable that the optical diffusion plate is provided with a diffusion pattern on a surface or an inside of the diffusion plate, which is rotatable by an electromagnetic means.

In the laser illuminator, it is preferable that the optical diffusion plate is provided with a diffusion pattern on a surface or an inside of the diffusion plate, which is vibratable by an electromagnetic means.

In the laser illuminator, it is preferable to use at least one optical diffusion plate having a thickness distribution.

In the laser illuminator, it is preferable to use at least one optical diffusion plate having a concavo-convex distribution.

In the laser illuminator, it is preferable to use at least one optical diffusion plate having a refractive index distribution.

In the laser illuminator, the optical diffusion plate is preferably at least one holographic optical diffusion plate (an optical diffusion plate having a distribution of non-periodic concavo-convex of approx. 5 µm).

In the laser illuminator, it is preferable to use at least one optical diffusion plate, wherein the concavo-convex, thickness or refraction index distribution is variable by using a liquid crystal, magnetic or dielectric material.

In the laser illuminator, the optical suppression means for suppressing divergence of light is preferably formed of at least one lens.

In the laser illuminator, the optical suppression means for suppressing divergence of light is preferably formed of at least one mirror.

In the laser illuminator, the optical suppression means for suppressing divergence of light is preferably formed of at least one lens and at least one mirror.

In the laser illuminator, the optical suppression means for suppressing divergence of light is preferably formed of a condenser lens and a collimator lens.

In the laser illuminator, the optical suppression means for suppressing divergence of light is preferably formed of a condenser mirror and a collimator mirror.

In the laser illuminator, the optical suppression means for suppressing divergence of light is preferably formed of a condenser lens and a collimator mirror.

In the laser illuminator, the optical suppression means for suppressing divergence of light is preferably formed of a condenser mirror and a collimator lens.

In the laser illuminator, the condenser lens is preferably a single lens having a positive focal length or a lens group having a positive focal length on the whole.

In the laser illuminator, the collimator lens is preferably a single lens having a positive focal length or a lens group having a positive focal length on the whole.

In the laser illuminator, the condenser mirror is preferably a single mirror having a position focal length and a mirror group having a positive focal length on the whole.

In the laser illuminator, the collimator mirror is preferably a single mirror and a mirror group having a positive focal length on the whole.

In the laser illuminator, the lens, the condenser lens, and the collimator lens are preferably selected from a single spherical lens, such as consisting of a lens for which one surface is plane having a positive focal length (a plano-convex lens), a bi-convex lens, a meniscus lens (a lens with convex surfaces of different curvature, or a crescent shaped lens in cross section (one concave surface and one convex surface) or a Fresnel lens, or non-spherical lens, or a lens group having a positive focal length on the whole, such as an achromatic lens, an apochromatic lens, a zoom lens, a video lens, a video zoom lens and a varifocal lens.

In the laser illuminator, the lens, the condenser lens, and the collimator lens are preferably selected from a single lens having a refractive index distribution of positive focal length, such as, a spherical lens, non-spherical lens, a GRADIUM lens, a GRIN lens, a rod lens, a SELFOC lens, graded index lens and a lens group thereof having a positive focal length on the whole.

In the laser illuminator, the mirror, the condenser mirror, or the collimate mirror are preferably selected from a single mirror, such as, a spherical mirror (a concave mirror), a non-spherical mirror, and a paraboloidal mirror, or a mirror group thereof having a positive focal length on the whole. The single mirror may be formed of an aggregate of plane mirrors.

In the laser illuminator, it is preferable to irradiate a laser beam in the normal direction with respect to an optical diffusion plate. The laser beam may be irradiated obliquely with respect to the optical diffusion plate.

In the laser illuminator, it is preferable to pass a laser beam through at least two optical diffusion plates (cf. FIG. 3).

In the laser illuminator, it is preferable to pass a laser beam two times or more through an optical diffusion plate (cf. FIGS. 3-1, 3-2($a$), 3-2($b$)).

In the laser illuminator, it is preferable to irradiate a laser beam obliquely with respect to the optical diffusion plate, because the laser beam can be easily passed two times or more through the optical diffusion plate (cf. FIG. 3-1).

In the laser illuminator, it is preferable to form an optical diffusion plate in a cylindrical shape so that a laser beam can pass two times or more through the optical diffusion plate (cf. FIGS. 3-2($a$), 3-2($b$)).

In the laser illuminator, it is preferable to combine a condenser mirror and a collimator lens in case of passing a laser beam two times or more through an optical diffusion plate (cf. FIGS. 3-1, 3-3).

In the laser illuminator, it is preferable to dispose a part of an optical diffusion plate between a condenser mirror and a collimator lens in case of passing a laser beam two times or more through the optical diffusion plate (cf. FIGS. 3-1, 3-3, 3-5).

In the laser illuminator, it is preferable to dispose a part of an optical diffusion plate between a condenser lens and a collimator lens in case of passing a laser beam two times or more through the optical diffusion plate (cf. FIGS. 3-2($a$), 3-2($b$)).

In the laser illuminator, it is preferable to combine an optical diffusion plate and a mirror so as to move concurrently in case of passing a laser beam two times or more through the optical diffusion plate (cf. FIGS. 3-4, 3-5).

In the laser illuminator, it is preferable to reflect a laser beam two times in a condenser mirror in case of passing a laser beam two times or more through the optical diffusion plate (cf. FIG. 3-5).

(Positional Relationship Between the Condenser Lens and the Optical Diffusion Plate)

In the laser illuminator, as shown in FIG. 2-2, the distance between an optical diffusion plate and an outer circumference of condenser lens on the side of the optical diffusion plate is preferably within $r \cdot \cot(\theta)$ (wherein $\theta$ represents an optical diffusion angle of the optical diffusion plate and r represents a radius of the condenser lens).

(Optical Diffusion Angle $\theta$ of the Optical Diffusion Means)

In the laser illuminator, the optical diffusion angle $\theta$ of the optical diffusion plate is preferably within 30°, more preferably within 15°, and the most preferably within 7.5° in view of a practical numerical aperture of the condenser lens.

(Radius of the Condenser Lens)

In the laser illuminator, the radius r of the condenser lens is preferably within 20 mm, more preferably within 10 mm, and the most preferably within 5 mm in case of making the whole laser illuminator within of a palm size.

(Distance)

In the laser illuminator, the distance between the optical diffusion plate and the condenser lens is preferably at least within 152 mm, more preferably within 56 mm, and the most preferably within 19 mm in case of making the laser illuminator within of a palm size. The optical diffusion plate and the condenser lens may be placed in an infinitesimal distance. In other words, the optical diffusion plate and the condenser lens may be contacted or integrated.

In the laser illuminator requiring particularly a large irradiation area, the value of the preferred radius and distance of the condenser lens ([0066], [0067]) explained hereinabove is not necessarily satisfied as long as the preferred positional relationship ([0064]) between the condenser lens and the optical diffusion plate is satisfied, although the whole assembly becomes bigger. In a stepper, the whole assembly may be bigger, even though irradiation area is small.

The diameter of the collimator lens is preferably longer than that of the condenser lens, more preferably 1.5 times to 20 times, more specifically 2 times to 10 times, the most preferably 2 times to 5 times longer than that of the condenser lens.

In the laser illuminator, the collimator lens is preferably to have the same focal distance as the condenser lens or a focal distance longer than that of the condenser lens. The laser illuminator can be easy to use, if the diameter of luminous flux of the laser beam which is normally 1 to 2 mm is subjected to enlarge so as not to reduce the diameter of luminous flux of the laser beam.

In the laser illuminator, the minimum distance between the optical diffusion plate and the condenser mirror is preferably within $2r \cdot \sin(\Phi \cdot \theta) \cdot \cos(\theta)/\sin(2\theta)$ (wherein $\theta$ is an optical diffusion angle of the optical diffusion plate, r is a radius of the condenser mirror and $\Phi$ is an inclination angle of the mirror with respect to the laser beam (cf. FIG. 2-3).

In the laser illuminator, the inclination angle of the mirror with respect to the laser beam may be acute or obtuse angle, although 45° is preferable from a standpoint of designing the laser illuminator easily (cf. FIGS. 1-2($a$), 1-2($b$)).

The laser illuminator is preferably provided with a mechanism for permitting the condenser lens and the collimator lens to move at least either in one of upper, lower, right and left, and parallel directions of the optical path of the laser beam so as to effect a fine adjustment of the position of the condenser lens and the collimator lens.

The laser illuminator is preferably provided with a mechanism for permitting any one of the optical diffusion plate, the condenser lens and the collimator lens to move so that the position of each of the equipments may be adjusted as appropriate.

The laser illuminator is preferably covered with a light shielding plate or a light shielding box so that an effective measure can be done for protecting the laser illuminator from a stray light or a radiation from the out side.

The laser illuminator is preferably used as a light source for a microscope or a spectroscopic microscope.

In the laser illuminator, the collimator lens preferably produces a parallel light beam having a size matched nearly to the size of an entrance iris of an objective lens in the microscope or the spectroscopic microscope.

The laser illuminator is preferably used as a light source for an optical lithography apparatus.

The present invention is to provide a microscope including any one of the laser illuminators as a laser illuminator.

In the microscope, the collimator lens preferably produces a parallel light beam in the nearly same size as that of an entrance iris of the objective lens.

In the microscope, the light beam is irradiated to be collected in a size of visual field of the microscope with the objective lens.

The present invention is to provide a spectroscopic microscope including any one of the laser illuminator as a laser illuminator.

In the spectroscopic microscope, the collimator lens preferably produces a parallel light beam in the nearly the same size as that of an entrance iris of the objective lens.

The present invention is to provide an optical lithography apparatus including any one of the laser illuminator as a light source.

In the present invention, the optical diffusion means implies means for diffusing or scattering light at random. When the laser beam is diffused by the optical diffusion means, the phase becomes at random and a total rectilinear propagation of the laser beam is lost. As an example of the optical diffusion means, an optical diffusion plate (optical diffusion plate 3-1 shown in FIG. 2) can be used.

The optical diffusion or the scattering angle is within the range of $0°<\theta<90°$. In the present invention, the optical diffusion or the scattering angle is preferably no more than $15°$ (no more than $30°$ at the scatter angle ($2\theta$). It is preferable to increase the angle for promoting the scattering as much as possible. The angle can not be set beyond a collective limit of the lens.

In the present invention, the optical suppression means for suppressing divergence of light implies an optical suppression means for not unduly magnifying the diffused light (light being magnified a diameter of the luminous flux and being out of phase by the diffusion), namely, a means for recovering only rectilinear propagation of the diffused laser beam losing a total rectilinear propagation due to diffusion, while the phase is being disturbed. As an example of the optical suppression means for suppressing divergence of light, a combination of lens 1 and 2 as shown in FIG. 2, a lens as shown in FIG. 1-1 and a mirror as shown in FIG. 1-5 can be used.

In the present invention, the diffused and non-magnified light refers to a light having a total rectilinear propagation, although the phase is disturbed. The above and the other features and advantages of the present, invention will be apparent from the following description in connection with the accompanying drawings.

BRIEF DESCRIPTION OF THE DRAWINGS

[FIG. 1-1] is a diagram schematically illustrating an example of a structure of a laser illuminator according to the present invention;

[FIG. 1-2(*a*)] is a diagram schematically illustrating another structure of a laser illuminator according to the present invention;

[FIG. 1-2(*b*)] is a diagram schematically illustrating a structure of a laser illuminator according to the present invention, wherein installation angle of a condenser mirror shown in FIG. 1-2(*a*) is modified;

[FIG. 2] is a diagram schematically illustrating another structure of a laser illuminator according to the present invention;

[FIG. 2-1] is a diagram schematically illustrating still another structure of a laser illuminator according to the present invention;

[FIG. 2-2] is a diagram explaining installation interval between an optical diffusion plate and a condenser lens according to the present invention;

[FIG. 2-3] is a diagram explaining installation interval between an optical diffusion plate and a condenser mirror according to the present invention;

[FIG. 3] is a diagram schematically illustrating still another structure of a laser illuminator according to the present invention;

[FIG. 3-1] is a diagram schematically illustrating still another structure of a laser illuminator according to the present invention;

[FIG. 3-2(*a*)] is a front view schematically illustrating still another structure of a laser illuminator according to the present invention;

[FIG. 3-2(*b*)] is a plan view of the structure shown in FIG. 3-2(*a*);

[FIG. 3-3] is a diagram schematically illustrating still another structure of a laser illuminator according to the present invention;

[FIG. 3-4] is a diagram schematically illustrating still another structure of a laser illuminator according to the present invention;

[FIG. 3-5] is a diagram schematically illustrating still another structure of a laser illuminator according to the present invention;

[FIG. 4] shows a laser illuminator according to a first embodiment of the present invention;

[FIG. 5] shows a laser illuminator according to a second embodiment of the present invention;

EXPLANATION OF REFERENCE NUMERALS

Figure 1:
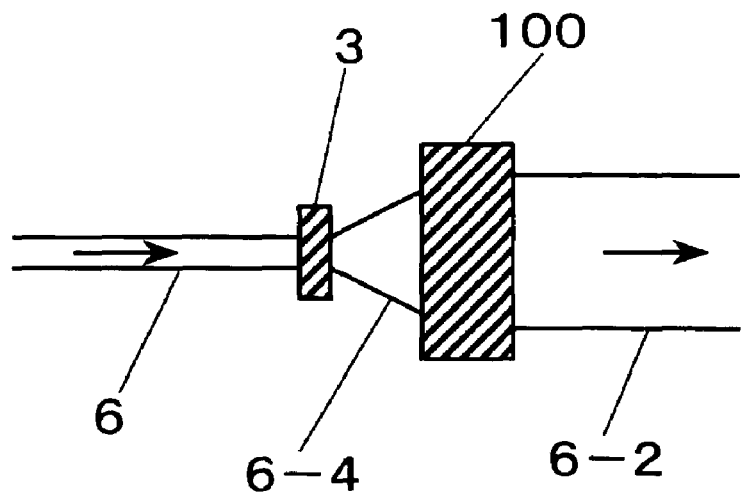
[FIG. 1] is a diagram schematically illustrating a structure of a laser illuminator according to the present invention.
Figure 1:
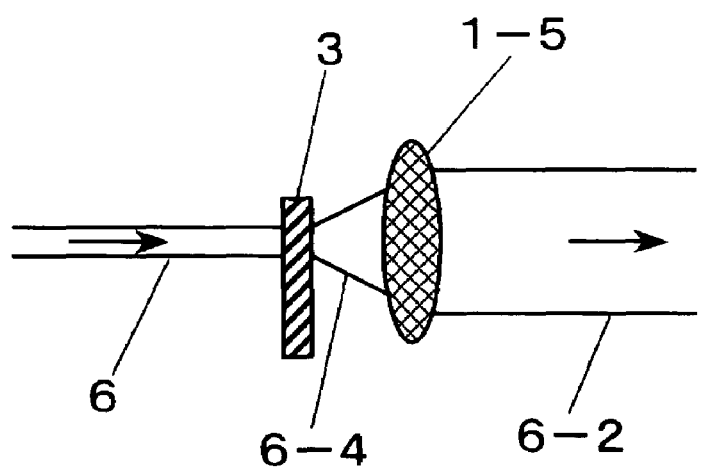
Figure 1:
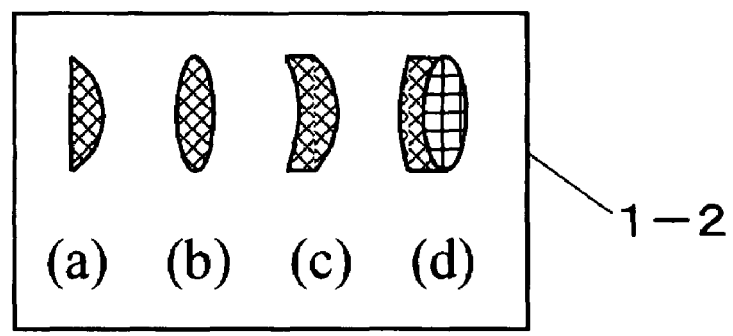

100 Optical suppression means for suppressing divergence of light
3 Optical diffusion means
1 Condenser lens
2 Collimator lens
1-2 Lens (showing various lens which can be used in place of a lens 1-5)
1-3 Condenser mirror
1-4 Condenser mirror
1-5 Lens
3-1 Optical diffusion plate
3-2 Optical diffusion plate having thickness distribution
3-3 Cylindrical optical diffusion plate
3-4 Cone shaped optical diffusion plate
4 Motor
5 Motor shaft
6 Laser beam
6-2 Diffused and non-divergent light beam
6-3 Laser apparatus
6-4 Diffused laser beam
7 Stage
8, 9 Micro-motion stage
10 Reference level
11 Front-to-back adjusting mechanism
11-2 Front-to-back adjusting mechanism
12 Vertical adjusting mechanism
13, 45 Right and left horizontal adjusting mechanism
16 Light shielding box
17 Laser source
18 Mirror
19 Filter
20 Laser illuminator
21 Beam splitter
22, 25 Objective lens
23 Sample
24 CCD camera
26 Lens
27 Spectroscope
30 Support frame
31 Tubular stage
32, 36, 42 Screw
33 Lever
34 Mounting plate
35 Upper stage
37 Lower stage
38 Common support stage
39 Windage adjusting mechanism
40 Base stage
41 Windage stage
43 Electrode
44 Flat surface

BEST MODE FOR CARRYING OUT THE INVENTION

An embodiment of the laser illuminator according to the present invention will be explained below by referring the drawings. In the drawings, identical or corresponding parts throughout the several views are indicated by the same reference characters, and the explanation will be omitted.

FIG. 1 is a diagram schematically illustrating a structure of a laser illuminator according to the present invention. In this laser illuminator, an optical diffusion means 3 is disposed in an optical path of a laser beam 6 for diffusing a laser beam 6 radiating from a laser source.

The optical diffusion means 3 is capable of modifying the optical diffusion condition. Thus, the diffusion condition of a diffused laser beam 6-4 is variable as a function of time.

An optical suppression means for suppressing divergence of light 100 converts the diffused laser beam 6-4 into a diffused and non-divergent light beam 6-2 preferably without leakage.

The diffused and non-divergent light beam 6-2 does not change the optical path, but the diffused condition changes as a function of time.

Accordingly, an object can be brightly and uniformly illuminated or excited with a relatively small laser power, if the diffused and non-divergent light beam 6-2 is used for illuminating an object.

Design becomes easy if the diffused and non-divergent light beam 6-2 is a parallel light beam.

FIG. 1-1 shows an embodiment of a laser illuminator according to the present invention. In the laser illuminator, the optical diffusion means 3 is disposed on an optical path of a laser beam for diffusing a laser beam 6 radiating from a laser source. Further, the laser illuminator is provided with a lens 1-5 on the extension of an laser path in the rear of the optical diffusion means 3, and the laser beam 6-4 diffused by the optical diffusion means 3 is converted into the diffused and non-divergent light beam 6-2 by the lens 1-5. A degree of parallelization of the diffused and non-divergent light beam 6-2 can be adjusted by changing a focal length of the lens 1-5, and distance between the optical diffusion means 3 and the lens 1-5.

In the laser illuminator, the lens 1-5 is selected from a single lens or a lens group having a positive focal length. Instead of the lens 1-5, a lens for which one surface is plane having a positive focal length (a plano-convex lens) (a), a bi-convex lens (meniscus lens) (b), a crescent shaped lens in cross section (one concave surface and one convex surface) (c), a single spherical or non-spherical lens or a combination lens group, such as, an achromatic lens as shown by the reference numeral 1-2 can be used. The lens (a) to (d) may be used to right and left reverse depending upon uses and object.

The lens 1-5 may be a single lens or a lens group having a positive focal length and a refractive index distribution. The lens having the refractive index distribution comprises a single lens, such as, spherical lens, non-spherical lens, a GRADIUM lens, a GRIN lens, a rod lens, a SELFOC lens, a graded index lens or a lens group thereof having a positive focal length on the whole.

The outer periphery of the lens is not necessarily circular in shape.

Figures 1, 2:
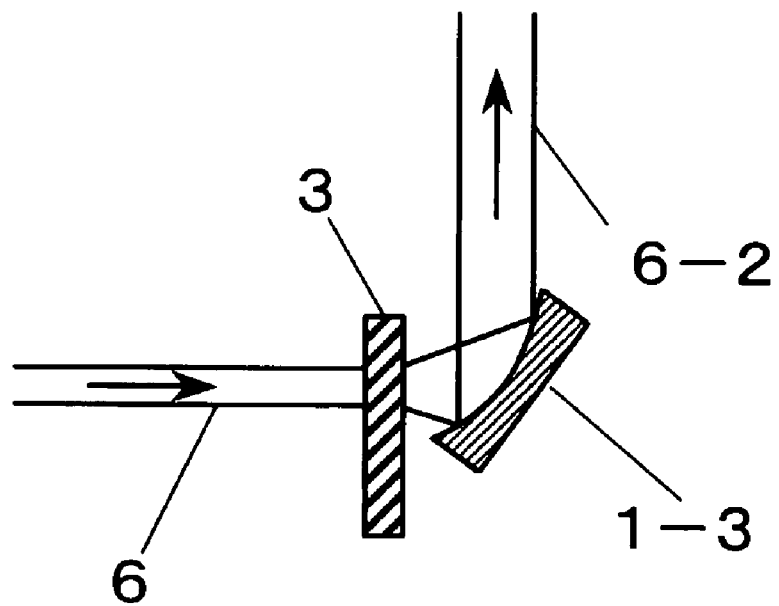
Figures 1, 2:
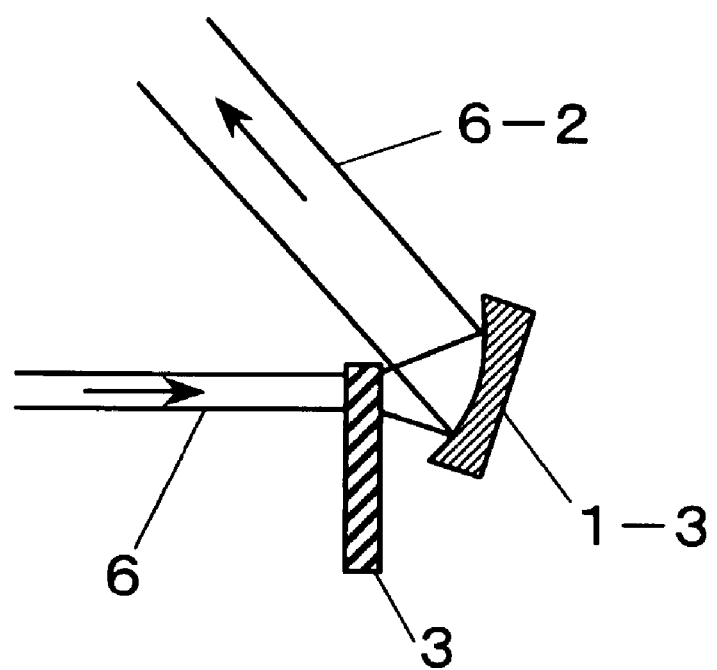

FIG. 2 is a diagram schematically illustrating an example of a structure of the laser illuminator according to the present invention. The laser illuminator of the present invention shown in FIG. 2 is provided with an optical diffusion plate 3-1 ratatable or vibratable by means of a motor 4, which is disposed on an optical path of a laser beam for diffusing the laser beam 6 radiating from a laser source. The laser beam diffused by the optical diffusion plate 3-1 is immediately condensed by means of a condenser lens 1 disposed on the extension of the optical path of the laser beam so that the diffused light is hardly scattered or lost. The condensed light then diverges, which is, in turn, converted into a diffused and non-divergent light beam 6-2 by a collimator lens 2 disposed on the extension of the optical path of the laser beam. The diffused and non-divergent light beam may be a parallel light beam (including substantially parallel optical flux).

The laser illuminator shown in FIG. 2 can condense the scattered light by the optical diffusion plate almost completely with the collimator lens, and a loss of light can be prevented. Although the condensed light diverges after passing through the condenser lens 1, the collimator lens 2 can easily convert the once condensed light into the diffused and non-divergent light beam 6-2 with nearly no loss. In the structure shown in FIG. 2, a parallel degree and a diameter of the diffused and non-divergent light beam 6-2 can be more easily adjusted in comparison with the laser illuminator shown in FIG. 1-1 by changing the relative position of the optical diffusion plate 3-1, the condenser lens 1 and the collimator lens 2. According to the present invention, a uniform and bright illumination can be performed by a small laser illuminator with a small number of components.

In the laser illuminator, the optical diffusion plate 3-1 irradiated the laser beam 6 from the laser source can be rotated or vibrated by the motor 4. It is to be understood that the motor may be rotated or vibrated with an electromagnetic power source or a power source using air pressure, window force, gas pressure, water stream, sonic wave, ultrasonic wave or fuel. The optical diffusion plate irradiated the laser beam from the laser source is subjected to have a relative movement or motion with respect to the laser beam by the rotation or vibration or a combination of the rotation and vibration of the optical diffusion plate. The optical diffusion plate may be subjected to have a rotational or vibrational movement or motion or a combination of a rotational and vibrational movement or motion by using a piezoelectric device, such as, a piezo motor.

In the laser illuminator, the optical diffusion plate may be made of a liquid crystal, magnetic or dielectric material, or a flexible material for which a surface or inside pattern is variable so that the pattern may be subjected to be modified or deformed or moved electro-magnetically. The surface or inside pattern of the liquid crystal, magnetic or dielectric material or the flexible material can be subjected to be variable, deformable or movable by a piezoelectric device or sonic wave or ultrasonic wave generated by a piezoelectric device.

In the laser illuminator, the laser beam may be passed through two sheets of the optical diffusion plate or the same optical diffusion plate more than two times (cf. FIGS. 3, 3-1 to 3-5).

In the present invention, the diffused and non-divergent light beam is referred to a small divergent degree of illumination light radiating from the laser illuminator of the present invention. The diffused and non-divergent light beam is practically regarded as a kind of a parallel light beam. A light not scattered and lost outside due to no divergence or a light not condensed within a substantial mean distance (several centimeters to several meters in view of the substantial size of the apparatus) can be referred to as the diffused and non-divergent light beam. In the present invention, the diffused and non-divergent light beam obtained may be considered as a light not scattered and lost in the optical path up to an object to be illuminated or the optical path up to an optical element leading the light to the object to be illuminated. Practically, it is possible to condense the light once in the optical path up to the object to be illuminated or the optical path up to an optical element leading the light to the object to be illuminated. In other words, in an optical illuminator in a palm size of the present invention, a variation of a cross section of an optical flux of the light in the optical path of several centimeters in length is within approximately 50%.

In the present invention, the condenser lens is referred to a lens for use in condensing a light, and is composed of a single lens or a lens group having a positive focal length. In the present invention, the collimator lens is referred to a lens for converting a diffused laser beam into a non-divergent light beam, specifically referred to a lens for use in producing a parallel or nearly parallel optical flux and is composed of a single lens or a lens group having a positive focal length.

In the laser illuminator of the present invention, a rotational speed of the optical diffusion means (optical diffusion plate) is suitably determined taking an observation time required for an apparatus to be used into consideration. For example, when an image is taken with a photographic film, CCD camera, or CMOS camera, the diffusion plate is subjected to rotate at least one time within the exposure time to effect homogeneous illumination (to an extent capable of achieving the maximum homogeneous illumination in the apparatus), and further rotation is not required. In a real time observation, such as, a recording of motion or in the event visually requiring uniform illumination, it is preferable to rotate the diffusion plate more than 20 rev./sec. in minimum corresponding to a speed of response, about 20 Hz, of human eyes. In order to reduce a flicker, more than 30 rev./sec. is more preferable, and more than 60 rev./sec. is the most preferable. In order to increase a frame speed of motion picture, the rotational speed is preferably above the frame frequency.

The optical diffusion plate may be subjected to vibrate or to have a pattern on a surface or an inside of the optical diffusion plate changed.

In the present invention, it is preferable to condense (focus) a diameter of optical flux of a diffused laser beam by the condenser lens after the diffusion, because of the following reasons.

1) The condensation makes the latter part of optical adjustments easy. Particularly, an adjustment of a parallel degree or a beam diameter becomes easy (the adjustment range becomes extremely narrow, if the diffused laser beam is not condensed).
2) The condensation of the diffused laser beam dispenses with a large collimator lens or optical element in a rear stage. A small optical element can collect a whole amount of the condensed light and condense the condensed light as appropriate so that the resultant light power is relayed to a next stage so as not to diverge beyond a certain limit to diminish a loss of the light amount. However, the condensation is preferably limited to one time and the condensed light is preferably to be changed into the parallel or nearly parallel right immediately, because a reflection loss on the lens surface is added, if the number of relay times is increased.
3) The once condensed light of the diffused laser beam can be treated as a point light source, which makes a design of the optical illuminator easy. Although uniform phase characteristic and going straight characteristic (coherence) of the laser beam is disturbed as a whole by the diffusion, the going straight characteristic in each direction remains to some extent after the diffusion. Accordingly, the diffused laser beam can be subjected to condense in small. A holographic optical diffusion plate is advantageous to use in the condensation, because information on the uniform phase characteristic and the going straight characteristic is continue to exist to some extent, which makes the diffused laser beam to condense easily.

In the present invention, the collimator lens is preferably used as a combination with a condenser lens or a condenser mirror for converting the diffused laser beam into the diffused and non-divergent light beam produced by the apparatus of the present invention as the parallel or substantially parallel light beam, because of the following reasons.
1) The parallel or substantially parallel light beam can propagate without scattering in a space.
2) Accordingly, there is little dissipation of light power due to no scattering, which makes a countermeasure against a stray light caused by the scattering easy. (less number of a light shielding plate is required.)
3) Thus, further handing becomes easy, for example, permitting to use in a microscope or a spectroscopic microscope. (irradiating to a distant place, dispensing relay lens, increasing a degree of freedom in design.)

The characteristics of the laser illuminator of the present invention can be summarized as follows:
1) The laser beam has a power and seems to be applied for a bright illumination. However, the laser beam has a spatial distribution.
2) The laser beam produces an interference fringe, if the laser beam is used as it is, because the laser beam has a specific character called coherence different from light by an electric lamp.
3) Speckle noises are generated, if the laser beam is diffused in order to have the spatial distribution uniform.
4) In order to reduce the speckle noises, the optical diffusion plate is moved to average the speckle noises.
5) The diffused laser beam is immediately condensed by the condenser lens so as not to be scattered and lost. (in the event that the diffused laser beam is converted into a parallel light beam at this stage, the parallel degree and the diameter of the optical flux of the parallel light beam cannot be adjusted independently, and fixed to a specific value determined by the focal length of lens. The diffused laser beam may be immediately converted into the parallel light beam without condensation depending upon intended application and object.)
6) The condensed light is preferably converted into a parallel light beam at this stage, because the condensed light diverges again as it is. The adjustment can be easy with an increase of lens. (an adjustment of the parallel degree and the diameter of optical flux of the parallel light can be independently done if a relative position of the two lens is adjusted.)
7) The condensed light is treated as a point light source, which makes a design easy.
8) Generally, it is difficult to observe an object, if a magnification of microscope is increased, because of a shortage of illumination light power. According to the present invention, the object can be observed brightly with a high magnification, even if the laser beam has less power.
9) A confocal microscope known in the art requires a high power laser, because a laser beam is condensed on an object and further scanned, and the price is extremely expensive. To the contrary, according to the present invention, a bright and extremely uniform illumination is possible with a small, inexpensive, less power laser source.

The laser or laser source for use in the laser illuminator of the present invention is not particularly limited. Any suitable laser or laser source can be selectively used depending upon intended application of the laser illuminator. As an example of the laser or laser source, a laser or laser source of relatively small power, such as, a GaAs/AlGaAs semiconductor laser of approximately 630 nm in wave length, approximately 1-2 mm in diameter of optical flux, and approximately 1-3 mW in intensity, a laser using second harmonic of $YVO_4$ solid-state laser excited by a semiconductor laser of approximately 1-3 mW in intensity, and a GaN/InGaN semiconductor laser of approximately 400 nm in wave length, approximately 1-2 mm in diameter of optical flux, approximately 1-3 mW in intensity, can be used. The laser may be a high power semiconductor laser, or a gas laser, such as, an argon-ion laser or excimer laser, a solid-state laser, such as, a glass laser or the harmonic thereof. The laser beam for use in the laser illuminator of the present invention may be a continuous wave laser. A pulsed laser having a repetition rate sufficiently faster than revolution or vibration of the optical diffusion plate can be used. A diameter of the optical flux may be larger, and the optical flux is not required to be circular in shape.

The laser illuminator of the present invention can be satisfactorily used for an illumination of a microscope, if the laser illuminator has power equivalent to a laser pointer.

The optical diffusion plate may be either a transparent or translucent plate, which has a surface having minute unevenness, or a holographic optical diffusion plate. The minute unevenness on a surface of the optical diffusion plate may be changed electro-magnetically. A single optical diffusion plate may be disposed on an optical path of the laser beam. Two or more optical diffusion plates may be located by being spaced at predetermined interval in and on the extension of the optical path of the laser beam. The optical diffusion plate may have an even thickness or may have a thickness distribution (an un-uniform suitable thickness).

FIG. 2-1 shows an example of an optical diffusion plate, of which the thickness is changed gradually. While the optical diffusion plate, which has a different thickness in position, is moving (for example, rotating), the thickness of the optical diffusion plate changes at a laser incidence position. As a result, a phase of the laser beam changes as a function of time after the laser beam is diffused. Advantageously, speckle noises can be further reduced.

The optical diffusion plate, which has a thickness distribution or a varying thickness, may be formed in various ways. Speaking strictly, even if thickness distribution of the optical diffusion plate is not recognized visibly, a thickness distribution exists in the optical diffusion plate, provided that thickness distribution is recognized microscopically.

FIG. 2-2 is a diagram explaining installation interval between the optical diffusion means and the condenser lens. The condenser lens 1 is disposed near to the optical diffusion means 3 as much as possible. Specifically, as shown in FIG. 2-2, the optical diffusion means and the condenser lens are spaced from each other within a distance L (r, θ) given by the following formula, because loss of light amount occurs when a distance between an optical diffusion means and a condenser lens exceeds the distance L (r, θ).

$$L(r, \theta) = r \cdot \cot(\theta) \quad (1)$$

where θ is a diffusion angle of the optical diffusion means 3 and r is a radius of the condenser lens 1. FIG. 2-2 shows a state where the installation interval between the optical diffusion means and the condenser lens is within L (r, θ).

In more detail, since exceeding the installation interval of L (r, θ) between the optical diffusion means 3 and the condenser lens 1 results in a leakage of diffused laser beam by the optical diffusion means 3 from an area outside the edge of the condenser lens 1, it is preferable to reduce a distance between the optical diffusion means 3 and the condenser lens 1 within the distance L (r, θ). In order to reduce loss of light amount due to oblique reflection at an incident surface of the condenser lens 1, particularly, due to oblique reflection at the area near to the edge of the condenser lens 1, it is desirable to dispose the condenser lens 1 more closely to the optical diffusion means 3. Using a lens having concave incident surface as a condenser lens may reduce the loss of light amount due to the oblique reflection.

From the point of view of practical minimum size of the laser illuminator, a condenser lens having a radius of 5 mm spaced by 18.7 mm or less from an optical diffusion means having a diffusion angle of 15° can satisfy the requirement condition in which the distance between the condenser lens and the diffusion means is equal or less than L (r, θ). However, disposing the condenser lens within 5 mm from the diffusion means reduces a loss of light amount due to the oblique reflection by about 10%. A combination of the condenser lens and the collimator lens having a radius within 20 mm, which converts diffused and condensed light from the condenser lens into non-divergent light beam (parallel light beam), is useful for reducing the whole size of the laser illuminator, in particular, for a microscope or microscopic spectroscopy in a palm size.

A condenser lens having a radius of 15 mm and an optical diffusion means having a diffusion angle of 15° can satisfy the requirement condition in which the distance between the condenser lens and the optical diffusion means is equal or less than L (r, θ), if the condenser lens is spaced by 56 mm or less from the optical diffusion means.

A condenser lens having a radius of 20 mm and an optical diffusion means having a diffusion angle of 7.5° can satisfy the requirement condition in which the distance between the condenser lens and the optical diffusion means is equal or less than L (r, θ), if the condenser lens is spaced by 152 mm or less from the optical diffusion means.

Setting dimensions of a laser illuminator to the above numerical values, minimum loss of light amount and uniform illumination can be attained. In this instance in which a holographic optical diffusion plate is used, transmittance of the laser beam through the holographic optical diffusion plate and the two lenses is approximately 80%, and uniformity is approximately within 5%. In this context, the uniformity means uniformity in spatial strength distribution (power distribution) of the generated light beam. Actually, the uniformity can be observed as RMS (root mean square) noises in a spatial distribution of light reflected from a flat object and the uniformity corresponds to the positions of 0 to 100 μm in FIG. 13.

Figure 2:
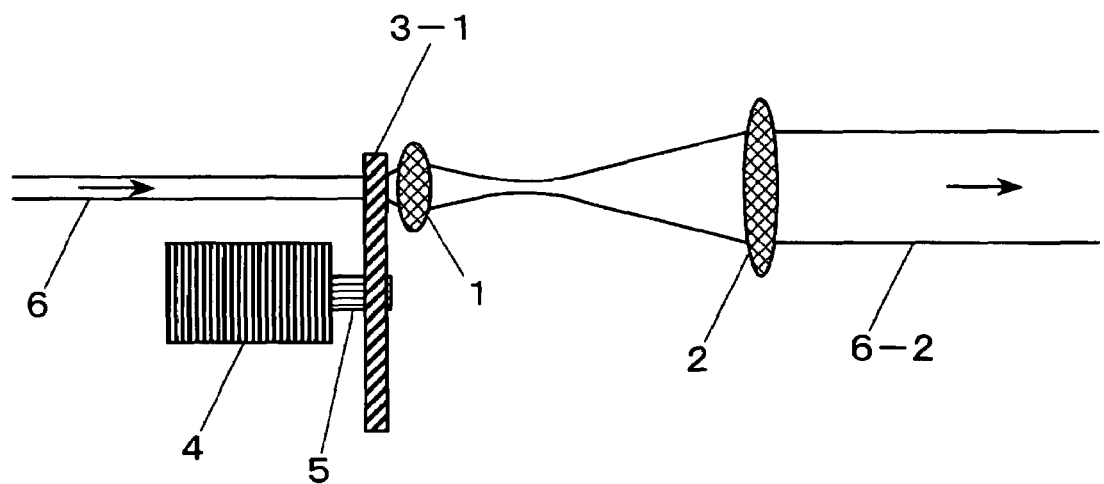
Figures 1, 2:
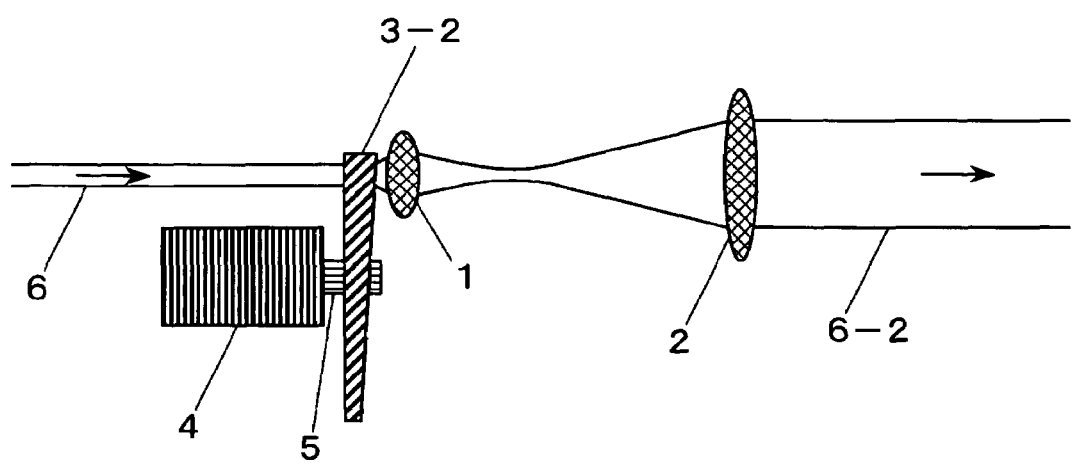
Figure 2:
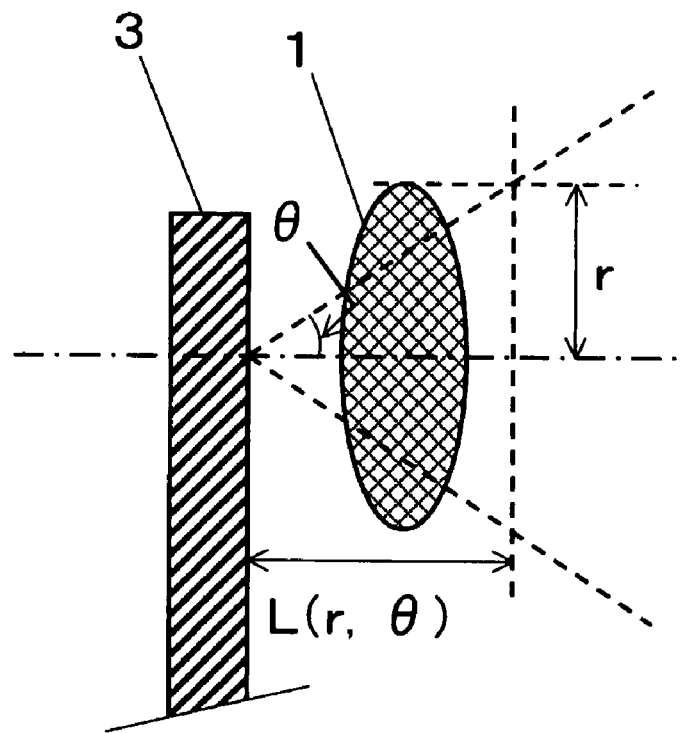
Figures 2, 3:
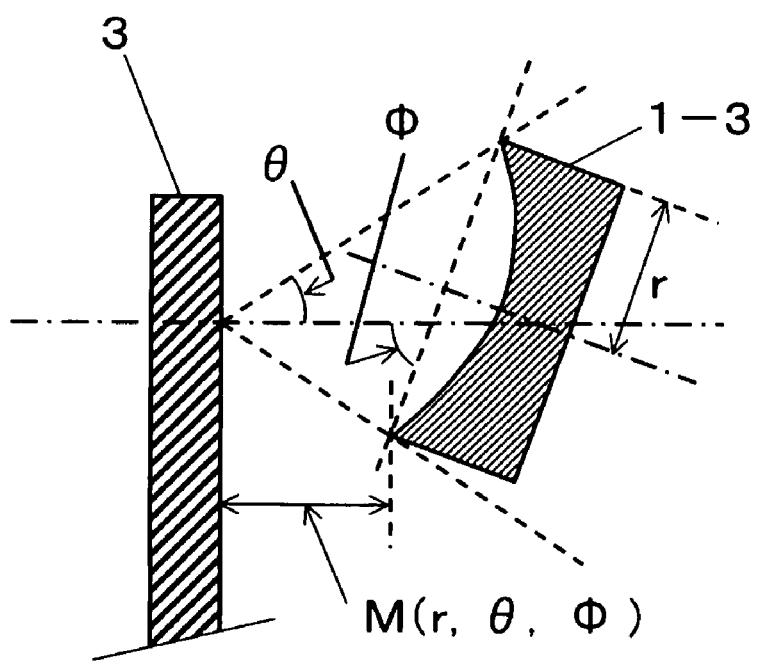

FIG. 2-3 is a diagram illustrating installation interval between an optical diffusion means and a condenser mirror. The condenser mirror 1-3 is preferably disposed close to the optical diffusion means 3. Specifically, as shown in FIG. 2-3, the optical diffusion means and the condenser mirror are spaced from each other within the distance M (r, θ, Φ) given by the following formula, because a loss of light amount occurs when the distance between the optical diffusion means and the condenser mirror exceeds the distance M (r, θ, Φ).

$$M(r,\theta,\Phi)=2r\cdot\sin(\Phi\cdot\theta)\cdot\cos(\theta)/\sin(2\theta) \quad (2)$$

where θ is a diffusion angle of the optical diffusion means 3, r is a radius of a condenser mirror 1-3, and Φ is a tilt angle of the mirror with respect to the laser beam.

FIG. 2-3 shows a state where the condenser mirror 1-3 is disposed at a position spaced by M (r, θ, Φ) from the optical diffusion means 3.

The condenser mirror 1-3 disposed at a tilt angle of 45° with respect to the laser beam deflects an optical path of light beam at 90°, which makes design easy (FIG. 1-2(*a*)). Φ may be smaller or larger than 45° (FIG. 1-2(*b*) shows an example where Φ is larger than 45°).

FIG. 3 is a diagram schematically illustrating a structure of the laser illuminator of the present invention in which two sheets of optical diffusion plate are used. The laser illuminator shown in FIG. 3 is provided with two sheets of optical diffusion plate 3-1, each of which can be rotated or vibrated by two motors. The optical diffusion plates are disposed to be overlapped on an optical path of the laser beam, and continuously diffuse the laser beam irradiated from a laser source by two sheets of optical diffusion plate. The diffused laser beam by the second sheet of the optical diffusion plates 3-1 (right side of the FIG. 3) is immediately converted into a diffused and non-divergent light beam 6-2 by a collimator lens 2 (FIG. 3 shows a crescent shaped lens having a positive focal length as an example) disposed on the optical path of the laser beam so that the diffused light is hardly scattered and lost. The diffused and non-divergent light beam 6-2 may be a parallel light beam (including substantially parallel light beam). The condenser lens (not shown) disposed between the optical diffusion plate 3-1 and the collimator lens 2 makes it possible to adjust a parallel degree and a diameter of luminous flux easily. According to the present invention, it is possible to provide a laser illuminator which is smaller in size and includes a laser source therein, if a small laser source 6-3 is arranged at a position adjacent to the motor 4.

FIG. 3-1 is a diagram schematically illustrating a structure of the laser illuminator of the present invention, in which a laser beam is transmitted to a sheet of optical diffusion plate twice. The laser illuminator shown in FIG. 3-1 is provided with an optical diffusion plate 3-1, which can be rotated or vibrated by a motor 4, is disposed obliquely on an optical path of the laser beam for diffusing the laser beam 6 radiating from a laser source by the optical diffusion plate 3-1. The diffused laser beam by the optical diffusion plate 3-1 is immediately condensed by a condenser mirror 1-3 disposed on the optical path of the laser beam so that the diffused light is hardly scattered. The diffused light diverges thereafter, which is, in turn, converted into a diffused and non-divergent light beam 6-2 by a collimator lens 2. The arrangement of the optical diffusion plate 3-1 between the condenser mirror 1-3 and the collimator lens 2 makes it possible for the laser beam to pass through a sheet of the optical diffusion plate twice to enhance the diffusion effect. The diffused and non-divergent light beam 6-2 may be a parallel light beam (including substantially parallel light beam). According to the present invention, it is possible to provide a laser illuminator which is smaller in size incorporating a laser source therein.

FIGS. 3-2(*a*) and 3-2(*b*) are diagrams schematically illustrating a structure of the laser illuminator of the present invention, in which an optical diffusion plate of cylindrical in shape is used for permitting a laser beam to pass through the optical diffusion plate twice. FIG. 3-2(*a*) is a front view of the laser illuminator, and FIG. 3-2(*b*) is a plan view of the laser illuminator. The laser illuminator shown in FIGS. 3-2(*a*) and 3-2(*b*) is provided with an optical diffusion plate of cylindrical in shape, which can be rotated or vibrated by a motor 4, on an optical path of the laser beam for diffusing the laser beam 6 radiating from a laser source by the cylindrical optical diffusion plate 3-3. The diffused laser beam by the cylindrical optical diffusion plate 3-3 is immediately condensed by a condenser lens 1 disposed on the optical path of the laser beam so that the diffused laser beam is hardly scattered and lost. The diffused light diverges thereafter, which is, in turn, converted into a diffused and non-divergent light beam 6-2 by a collimator lens 2. In this example, the condenser lens 1 is disposed within the cylindrical optical diffusion plate 3-3, and the collimator lens 2 is disposed outside of the cylindrical optical diffusion plate 3-3 and in the rear of the optical path with respect to the condenser lens 1. In this manner, the cylindrical optical diffusion plate 3-3 is also disposed in the rear of the condenser lens and between the condenser lens and the collimator lens. This arrangement permits the laser beam to pass through a single cylindrical optical diffusion plate twice to enhance the diffusion effect. The diffused and non-divergent light beam 6-2 may be a parallel light beam (including substantially parallel light beam). According to the present invention, it is possible to provide a laser illuminator which is smaller in size incorporating a laser source therein.

FIG. 3-3 is a diagrammatic view schematically illustrating a structure of another example of the laser illuminator of the present invention, in which an optical diffusion plate of cylindrical in shape is used for permitting a laser beam to pass through the optical diffusion plate twice. The laser illuminator shown in FIG. 3-3 is similar to the laser illuminator shown in FIGS. 3-2(*a*) and 3-2(*b*). The laser illuminator shown in FIG. 3-3 is an example of disposing a condenser mirror 1-3 within a cylindrical optical diffusion plate 3-3. According to the present invention, it is possible to provide a laser illuminator which is smaller in size incorporating a laser source therein.

Figure 3:
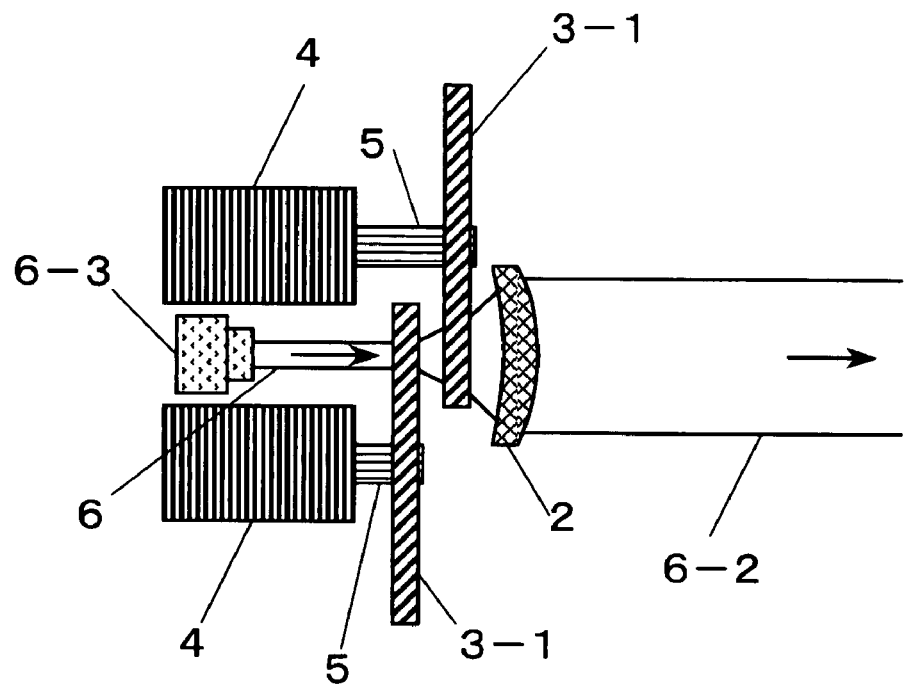
Figures 1, 3:
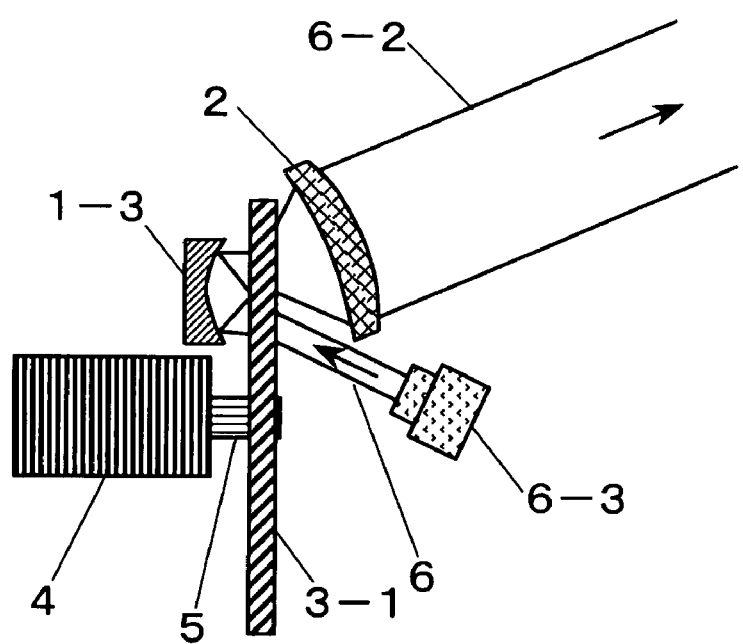
Figures 2, 3:
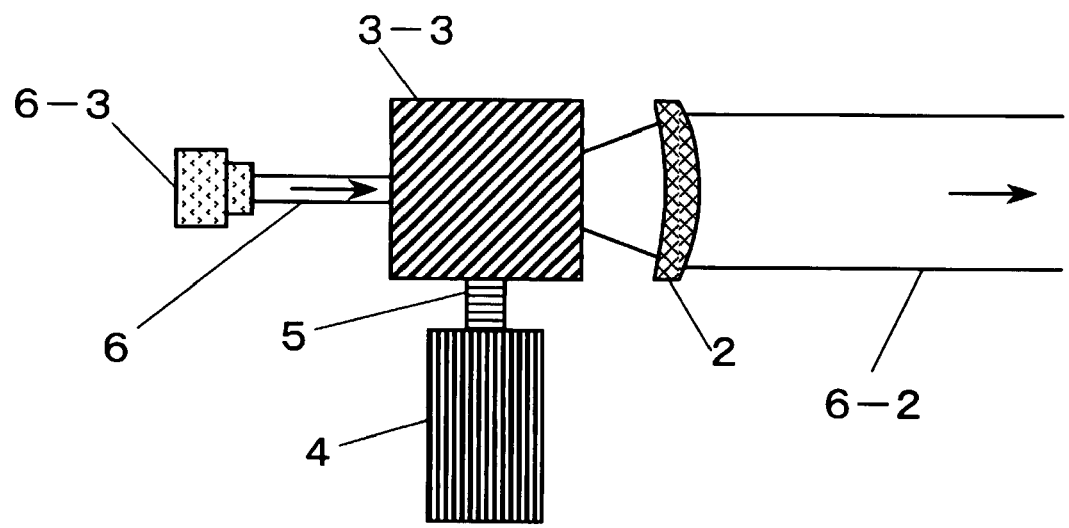
Figures 2, 3:
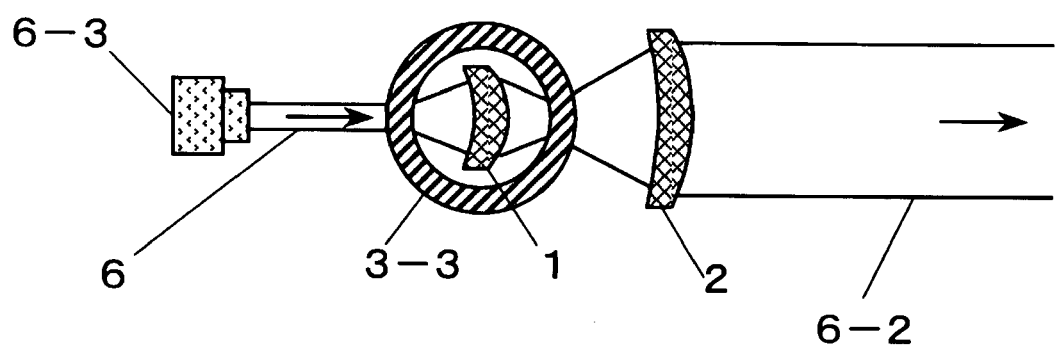
Figure 3:
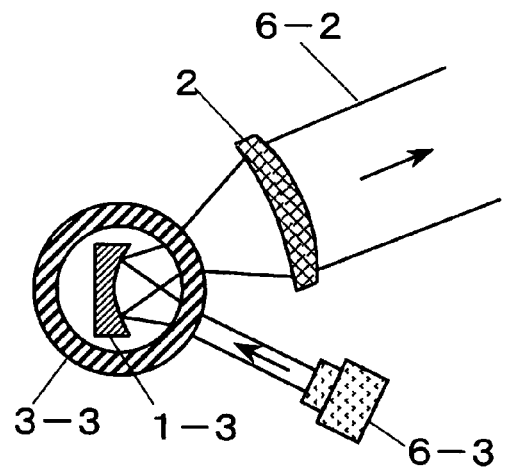
Figures 3, 4:
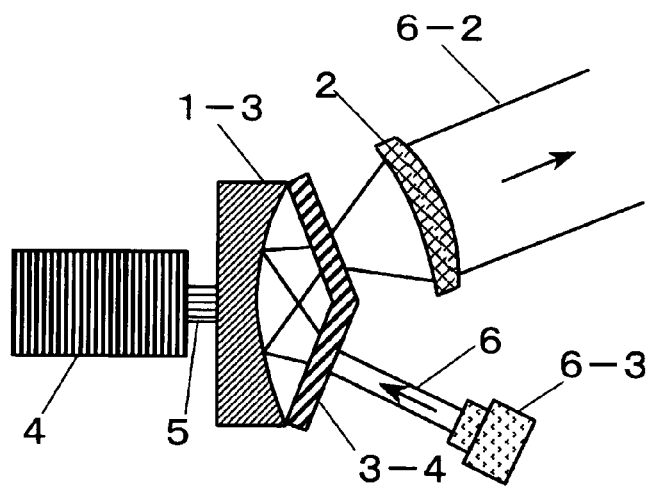

FIG. 3-4 is a diagrammatic view schematically illustrating a structure of the laser illuminator of the present invention, in which an optical diffusion plate and a mirror are integrated and moved together when a laser beam is passed through the optical diffusion plate more than two times. The laser illuminator of the present invention integrates a cone shaped optical diffusion plate 3-4 and a condenser mirror 1-3 as shown in FIG. 3-4, and the integrated cone shaped optical diffusion plate 3-4 and the condenser mirror 1-3 are rotated or vibrated by a motor 4. The laser beam 6 after passing through the cone shaped optical diffusion plate 3-4 proceeds to the inside space between the optical diffusion plate 3-4 and the condenser mirror 1-3. The diffused laser beam is then condensed by the condenser mirror 1-3 and transmitted from an opposite side beyond an apex of the cone shaped optical diffusion plate 3-4. The transmitted light beam is then converted into a diffused and non-divergent light beam 6-2 by a collimator lens 2. The diffused and non-divergent light beam 6-2 may be a parallel light beam (including substantially parallel light beam). In this example, a condensing position by the condenser mirror 1-3 may coincide with the position of the cone shaped optical diffusion plate 3-4. According to the present invention, it is possible to provide a laser illuminator which is smaller in size incorporating a laser source therein.

Figures 3, 4, 5:
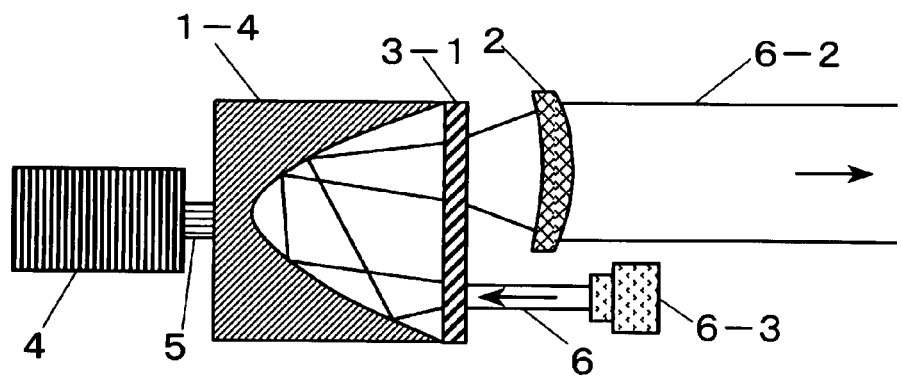
Figure 4:
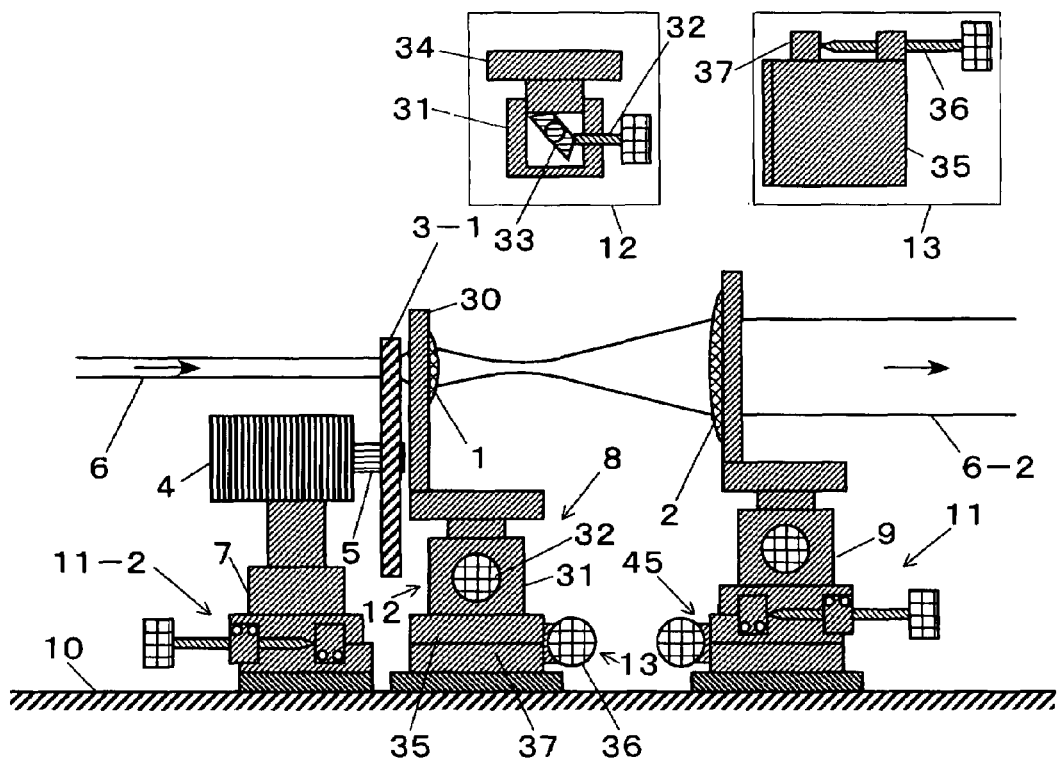
Figure 5:
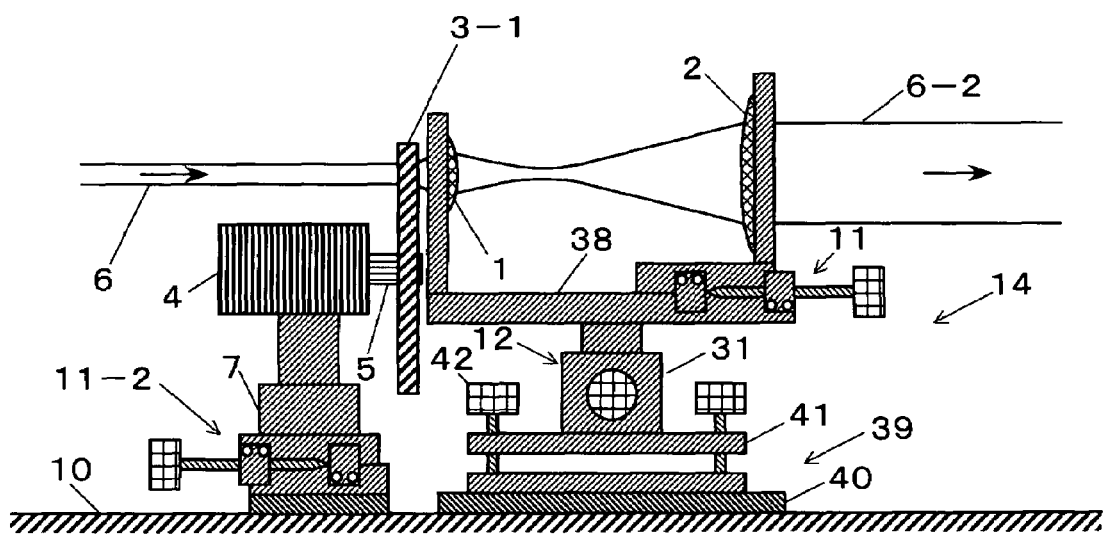

FIG. 3-5 is a diagrammatic view schematically illustrating a structure of another example of the laser illuminator of the present invention, in which an optical diffusion plate and a mirror are integrated and moved together when a laser beam is passed through the optical diffusion plate more than two times. The laser illuminator of the present invention integrates the optical diffusion plate 3-1 and the condenser mirror 1-4 as shown in FIG. 3-5. First, the integrated optical diffusion plate 3-1 and the condenser mirror 1-4 are rotated or vibrated by a motor 4. The laser beam 6 after passing through the optical diffusion plate 3-1 proceeds to the inside space between the optical diffusion plate 3-1 and the condenser mirror 1-4. The diffused laser beam is then condensed by the condenser mirror 1-4 and transmitted from the optical diffusion plate 3-1. The transmitted light beam is then converted into a diffused and non-divergent light beam 6-2 by a collimator lens 2. The diffused and non-divergent light beam 6-2 may be a parallel light beam (including substantially parallel light beam). In this example, a condensing position by the condenser mirror 1-4 may not coincide with the position of the optical diffusion plate 3-1. According to the present invention, it is possible to provide a laser illuminator which is smaller in size incorporating a laser source therein.

The present invention is based on the following concept of the invention (A).

(A) A laser illuminator comprising at least one variable optical diffusion means disposed in the direction of an optical path of a laser beam, a condenser lens disposed on the optical path of the diffused laser beam, and a collimator lens for converting the diffused and condensed laser beam from the condenser lens into a parallel light beam, the collimator lens having a focal length longer than that of the condenser lens or having the same focal length as that of the condenser lens, characterized in that the diffused and non-divergent light beam from the collimator lens illuminates an object or a surface of the object.

EMBODIMENT 1

FIG. 4 shows a first embodiment of a laser illuminator according to the present invention. The laser illuminator in the first embodiment is provided with an optical diffusion plate 3-1 as an optical diffusion means and a combination of a condenser lens 1 and a collimator lens 2 as an optical suppression means for suppressing divergence of light, each of which is disposed on an optical path of a laser beam 6 as explained in FIGS. 2, 2-1, and 2-2.

As a laser beam 6, a continuous-wave green laser using a second harmonic of a $YVO_4$ laser, 532 nm in wavelength, 1 mm in luminous flux diameter, and 3 mW in intensity, excited by a semiconductor laser is used.

The optical diffusion plate 3-1 (holographic optical diffusion plate manufactured by Edmond Co., Ltd. Trade name: Holographic diffusion plate) is connected to a motor shaft 5 of a motor 4, which is supported on a stage 7 disposed on a reference surface 10 so as to rotate or vibrate the optical diffusion plate 3-1 in the vertical plane with respect to the laser beam 6.

The condenser lens 1 (single lens with refractive index distribution, 5 mm in radius, 2.5 mm in lens thickness, 18 mm in focal length, manufactured by Newport Co., Ltd. Trade name: GRADIUM single lens) is mounted on a support frame 30, which is attached to a micro motion stage 8 on the reference surface 10. The micro motion stage 8 can move vertically and horizontally to adjust the position of the condenser lens 1 with respect to the optical path of the laser beam. Eventually, this adjustment also supplies changes of the optical path of the laser beam diffused by the optical diffusion plate 3 and the optical path of the parallel light beam (non-divergent light beam) transmitted from the collimator lens 2. The micro motion stage 8 has a vertical adjusting mechanism 12 and a horizontal adjusting mechanism 13.

In the vertical adjusting mechanism 12, a lever 33 pivotably attached to a cylindrical stage 31 adjusts a position of a mounting plate 34 by operating a screw 32 threaded in a cylindrical stages 31. In this manner, the support frame 30 connected to the mounting plate 34 is adjusted vertically.

In the horizontal adjusting mechanism 13, a screw 36 threaded in an upper stage 35 is operated for moving the upper stage 35 on a lower stage 37 disposed on the reference surface 10. In this manner, the upper stage 35 supporting the cylindrical stage 31 is moved horizontally to the reference surface 10 and vertically to the optical path of the laser beam 6.

The collimator lens 2 (single lens with refractive index distribution, 12.5 mm in radius, 6 mm in lens thickness, 60 mm in focal length, manufactured by Newport Co., Ltd. Trade name: GRADIUM single lens) can be adjusted vertically and horizontally with respect to the optical path of the laser beam 6 in a manner similar to that of the condenser lens 1 by a vertically movable micro motion stage 9 together with a horizontal adjusting mechanism 45 mounted on the reference surface 10. Furthermore, the collimator lens 2 can be adjusted along the direction of optical path of the laser beam 6 by means of a front and back adjusting mechanism 11.

In this instance, the installation interval between the condenser lens 1 and the optical diffusion plate is 3 mm, and the installation interval between the condenser lens 1 and the collimator lens 2 is 70 mm.

In the laser illuminator of the first embodiment, the laser beam 6 enters the optical diffusion plate 3-1 from the left side of FIG. 4. Then, as described with FIG. 2 or 2-2, the laser beam 6 is diffused by the optical diffusion plates 3-1, 3-2 or 3, condensed by the condenser lens 1, and paralleled by the collimator lens 2. Position of the condenser lens 1 and the collimator lens 2 and the degree of parallelization of the parallel light beam can be adjusted by the micro motion stages 8 and 9. In this manner, the laser illuminator of the present invention allows to illuminate an object uniformly and nearly without loss of light amount.

EMBODIMENT 2

FIG. 5 shows a laser illuminator according to a second embodiment of the present invention. In the second embodiment, a front and back adjusting mechanism 11 can adjust degree of parallelization of a parallel light beam generated from laser beam 6. Moreover, both a condenser lens 1 and a collimator lens 2 are mounted on a sole common support stage 38. A micro motion stage 14 can be adjusted by means of a vertical adjusting mechanism 12 and a tilt adjusting mechanism 39 (tilting adjustment mechanism).

The tilt adjusting mechanism 39 can adjust height and tilt adjustment by screws 42 set in a windage stage 41 supporting a cylindrical stage 31 with respect to a base stage 40 mounted on a reference surface 10. This structure allows fine alignment of the optical path of the parallel light beam generated from laser beam 6.

EMBODIMENT 3

Figure 6:
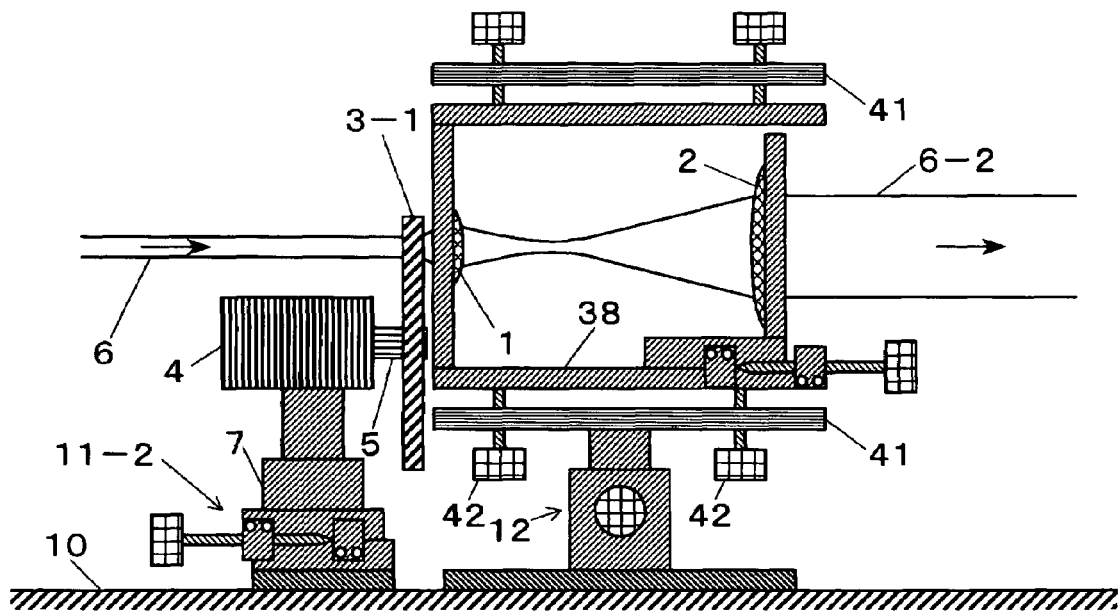
[FIG. 6] shows a laser illuminator according to a third embodiment of the present invention.

FIG. 6 shows a laser illuminator according to a third embodiment of the present invention. The third embodiment is substantially the same as the second embodiment. However, a common support stage 38 can be tilted by means of screws 42 with respect to a windage stage 41 (for example, it is indicated as a cross section of a cylinder here) which is vertically adjustable by means of a vertical adjusting mechanism 12.

EMBODIMENT 4

Figure 7:
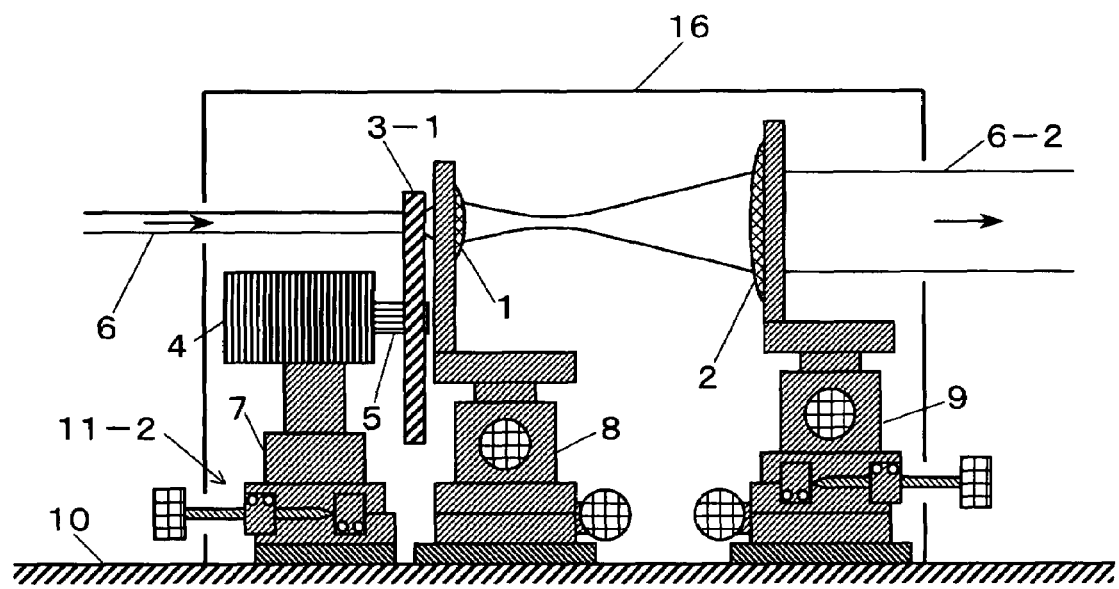
[FIG. 7] shows a laser illuminator according to a fourth embodiment of the present invention.

FIG. 7 shows a laser illuminator according to a fourth embodiment of the present invention. In this embodiment, the laser illuminator is covered with a light shielding box 16 to reduce influence of external lights.

(Example of Application)

Figure 8:
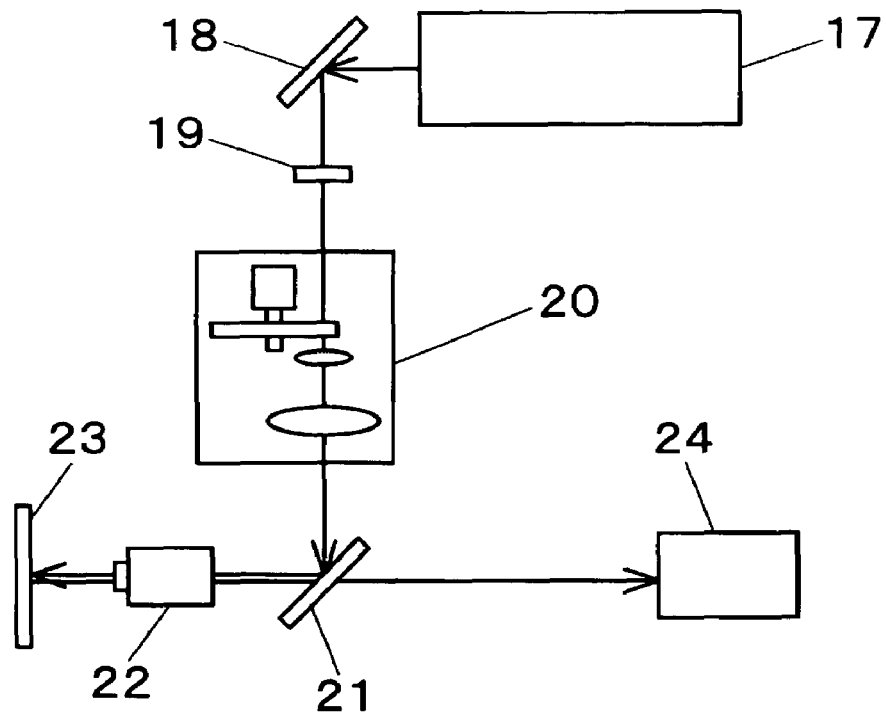
[FIG. 8] shows a whole structure of a microscope embodying a laser illuminator according to the present invention.

FIG. 8 is a diagram illustrating a whole structure of a microscope system using a laser illuminator according to the present invention. In the microscope system, a laser source 17 emits a laser beam to a laser illuminator 20 via a mirror 18 and a filter 19. In the application, a continuous-wave green laser using a second harmonic of a $YVO_4$ laser, 532 nm in wave length, 1 mm in optical length, and 3 mW in intensity, exited by a semiconductor laser is used as a laser beam 6. The laser illuminator 20 diffuses the laser beam and converts the diffused laser beam into a diffused and non-divergent light beams (parallel-like light beam). The laser illuminator 20 of the embodiment 1 is used in this example.

The parallel-like light beam from the laser illuminator 20 illuminates a sample (specimen) 23 via a beam splitter 21 and an objective lens 22. A CCD camera 24 images light reflected from the sample 23 via the objective lens 22 and the beam splitter 21.

In this application, the laser beam is diffused, and converted into a uniform parallel-like light beam. Then, the parallel-like light beam enters the objective lens 22 in front of the specimen 23. The objective lens 22 condenses the parallel-like light beam. The condensed light provides a uniform intensity distribution spatially on the specimen 23. Thus, measurement errors due to variations in optical intensity distribution are prevented.

Figure 9:
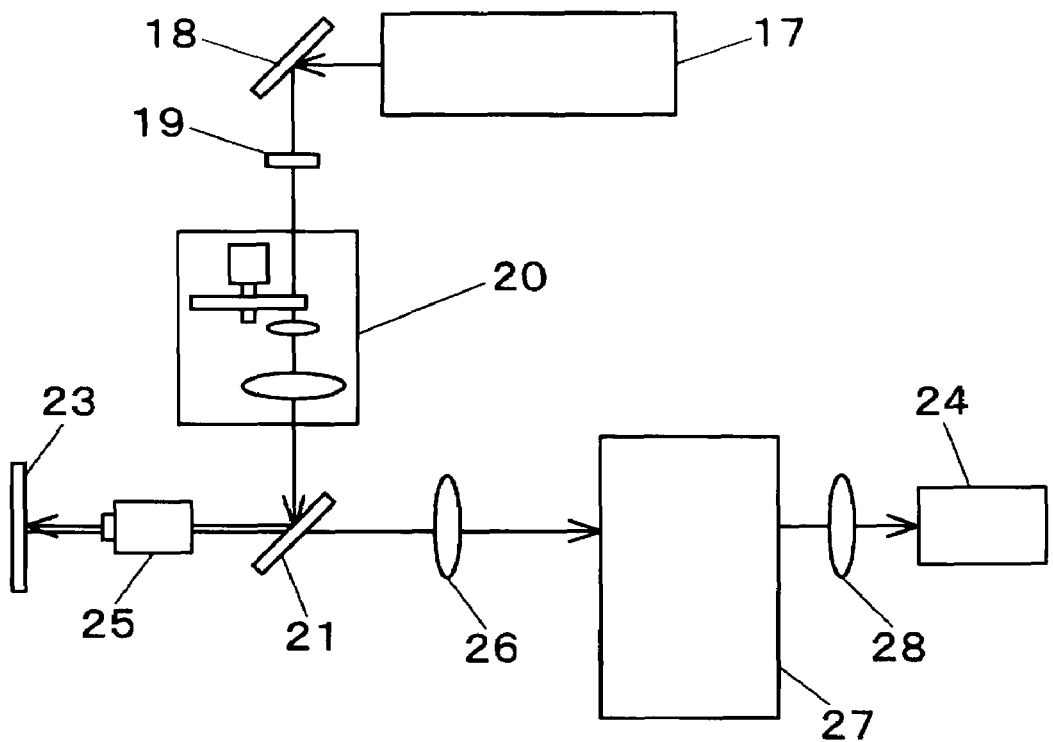
[FIG. 9] shows a whole structure of a spectroscopic microscope embodying a laser illuminator according to the present invention.

FIG. 9 is a diagram illustrating a whole structure of a spectroscopic microscope of another application of a laser illuminator of the present invention. In this spectroscopic microscope, a laser source 17 emits a laser beam to a laser illuminator 20 of the present invention via a mirror 18 and a filter 19. The laser illuminator 20 diffuses the laser beam and then converts diffused light into a parallel-like light beam.

The laser illuminator 20 illuminates a sample or specimen 23 via a beam splitter 21 and an objective lens 25. A spectroscope 27 receives the reflected light via the objective lens 25, the beam splitter 21 and a lens 26 for obtaining a spectroscopic image. A CCD camera 24 images the spectroscopic image via a lens 28.

In this application, the laser beam is diffused, and converted into a uniform parallel-like light beam. Thus, the objective lens 25, disposed in front of the specimen 23, receives and condenses the parallel-like light beam. Also after the condensation by the objective lens, a spatially uniform intensity distribution is formed on the specimen 23. The measurement errors due to variations in optical intensity distribution are prevented.

(Experiment)

In order to check effect of the present invention, an experiment was performed. In the experiment, a semiconductor circuit was imaged by a conventional microscope, which does not use the laser illuminator 20, and the microscope according to the present invention shown in FIG. 8. The results are explained below.

Figure 10:
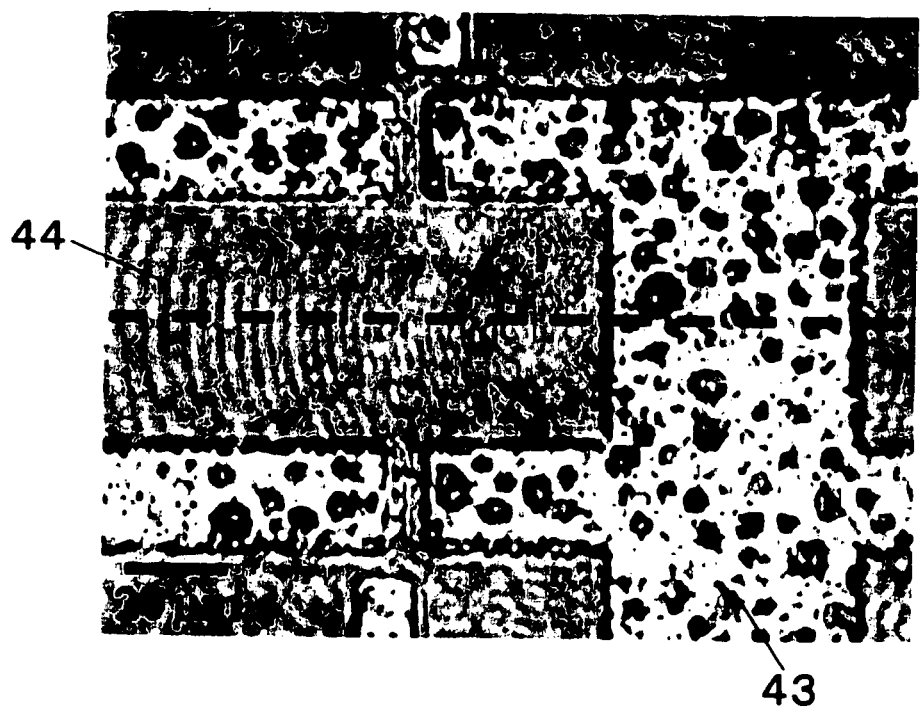
[FIG. 10] shows an image taken by using a conventional microscope.

FIG. 10 shows a microscopic photograph imaged with the conventional microscope (without using laser illuminator 20 in FIG. 8). Referring to FIG. 10, area indicated by numeral 43 represents a metal electrode and 44 represents a flat surface in the semiconductor circuit. In this image (microscopic photograph), interference patterns caused by un-uniform intensity distribution of an illumination light using a laser beam appear on the flat surface 44. In this regard, the image is not clear.

Figure 11:
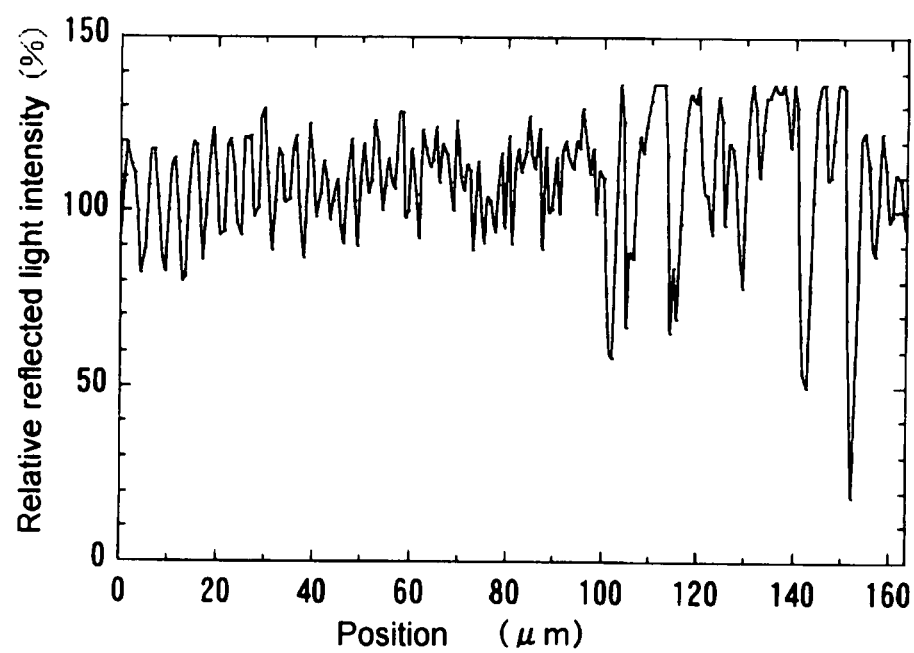
[FIG. 11] shows a graph plotting relative reflected light intensities with respect to positions measured along the dotted line of FIG. 10.

FIG. 11 is a graph plotting the result of relative intensity of reflected light as a function of position, measured along the dotted line in FIG. 10. Referring to FIG. 11, in the case of conventional microscope without using the laser illuminator 20, it is confirmed that the relative intensity of reflected light varies at every position and the sample (specimen) is not illuminated with uniform light intensity.

Figure 12:
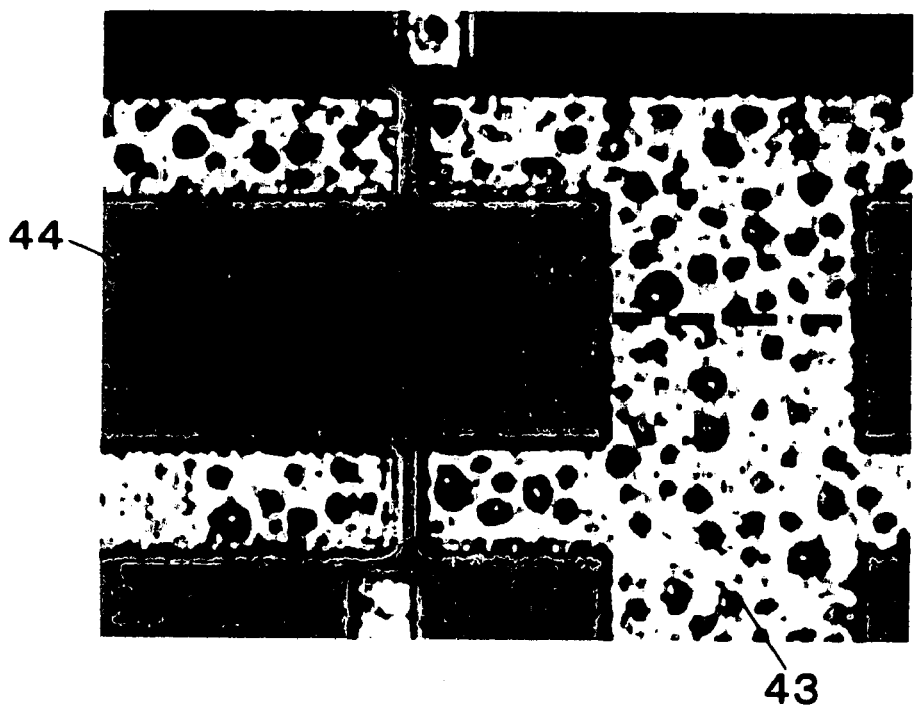
[FIG. 12] shows an image taken by using a microscope embodying a laser illuminator of the present invention.

FIG. 12 shows a microscopic photograph imaged with the microscope using the laser illuminator 20 of the present invention shown in FIG. 8 and rotating the optical diffusion plate of the laser illuminator 20. This image is very clear. The reason is that interference does not occur because intensity of illumination light by the laser illuminator is very uniform on the flat surface 44.

Figure 13:
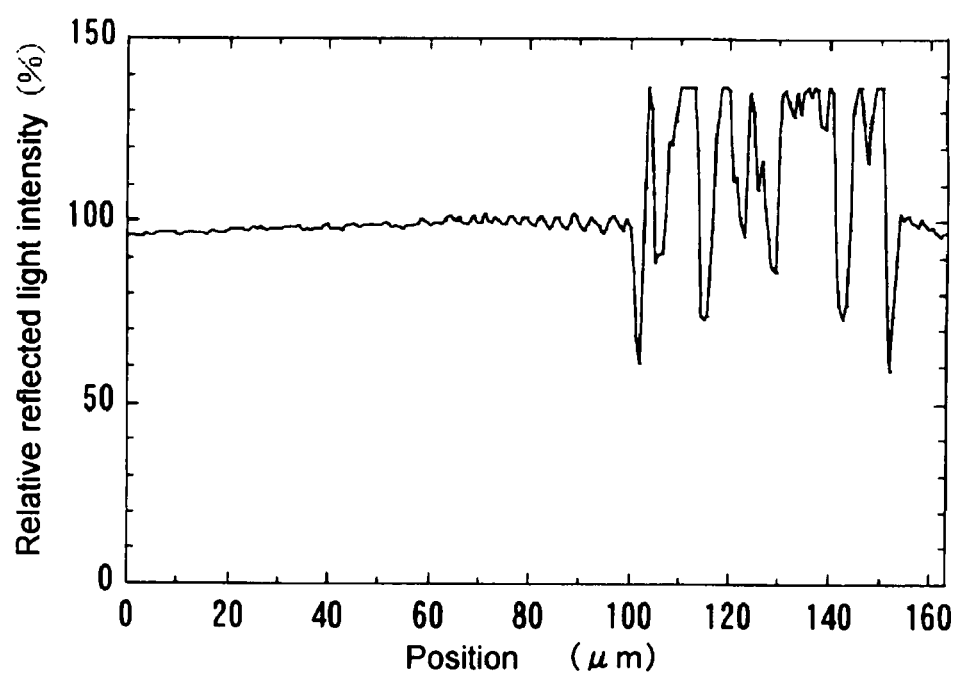
[FIG. 13] shows a graph plotting relative reflected light intensities with respect to positions measured along the dotted line of FIG. 12.

FIG. 13 is a graph plotting the results of relative intensity of reflected light as a function of position, measured along the dotted line in FIG. 12. According to FIG. 13, it is confirmed that the laser illuminator 20 and the rotation of the optical diffusion plate eliminates variations in the relative intensity of reflected light as shown in FIG. 11. The microscope illuminates the sample (specimen) with the very uniform illumination light.

Figure 14:
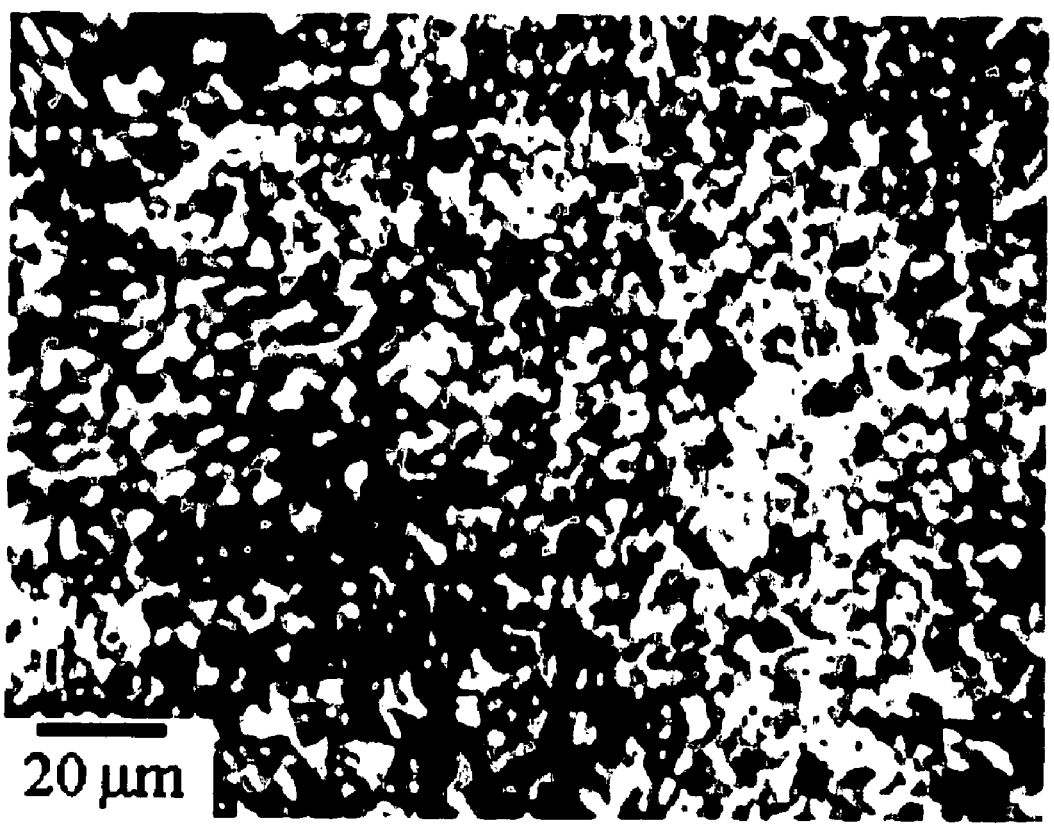
[FIG. 14] shows an image taken by using a microscope embodying a laser illuminator not by rotating an optical diffusion plate according to the present invention.

To the contrary, FIG. 14 shows a photograph imaged with a microscope using the laser illuminator 20 shown in FIG. 8 not rotating the optical diffusion plate. As is apparent from FIG. 14, if the optical diffusion plate is not rotated, speckle noises are generated and the image becomes extremely rough. Then, the optical diffusion plate is rotated. The rotation of the optical diffusion plate improves the image drastically as shown in FIG. 12. This is because the speckle noises occurred at random and the phase disturbed by a uneven surface of the optical diffusion plate are subjected to be averaged by the rotation of the optical diffusion plate and the time integration during the rotation of optical diffusion plate at one time or more or any suitable time.

Thus, the laser illuminator of the present invention is substantially free from a loss of light amount and is capable of illuminating an object uniformly and brightly with a relatively less power of a laser beam.

Accordingly, the laser illuminator of the present invention is smaller in size and less expensive and is advantageous in energy-saving and reducing a generation of carbon dioxide. Furthermore, the laser illuminator is capable of incorporating into handy measuring instruments.

According to the present invention, conventional un-uniform intensity distribution of light in a plane perpendicular to a path of a laser beam is almost eliminated. A loss of light amount is very small and substantially negligible. Accordingly, an object surface can be illuminated uniformly and brightly, and the laser illuminator of the present invention is applicable to equipments requiring uniform illumination.

For example, the present invention can eliminate measuring errors and improves quality of unclear images when a laser beam is used for various optical measurements or image creations. The present invention is useful for various measuring equipments and image/video creation equipments utilizing a laser beam, and for optical lithography equipments, utilized for making circuits on semiconductor substrates Particularly, a laser illuminator of the present invention can provide brighter and uniform illumination for microscopes or instruments relating spectroscopic microscope measurements. When the present invention is used for supplying an excitation light for microscopic observations or spectral-resolved microscopic measurements, the excitation light becomes more uniformly and strongly in comparison with an excitation light generated by conventional illuminators. Moreover, when the laser illuminator is used as the light source for an optical lithography equipment, the laser illuminator can illuminate a semiconductor substrate more uniformly and more strongly.

A best mode of a laser illuminator of the present invention has been explained according to embodiments. However, the present invention should not be limited only to the proposed embodiments. Various other embodiments will be considered within scope of technical matters defined in the attached claims.

The invention claimed is:

1. A laser illuminator comprising:
at least one optical diffusion means capable of modifying an optical diffusion condition; and
at least one optical suppression means for suppressing divergence of light, wherein
said optical diffusion means and said optical suppression means are disposed along an optical path of a laser beam radiating from a laser source and jointly convert said laser beam into a diffused and non-divergent light beam for illuminating or exciting an object, and
said optical diffusion means comprises an optical diffusion plate capable of modifying an optical diffusion condition and is electromagnetically rotatable, to make a concavo-convex distribution at the surface of the optical diffusion means or a refraction index distribution at the inside of the optical diffusion means be electromagnetically variable.

2. The laser illuminator according to claim 1, wherein said optical diffusion plate comprises at least one optical diffusion plate having a thickness distribution.

3. The laser illuminator according to claim 1, wherein said optical diffusion plate comprises at least one optical diffusion plate having a refractive index distribution.

4. The laser illuminator according to claim 1, wherein said optical diffusion plate is at least one holographic optical diffusion plate.

5. The laser illuminator according to claim 1, wherein said optical suppression means comprises at least one lens.

6. The laser illuminator according to claim 1, wherein said optical suppression means comprises at least one mirror.

7. The laser illuminator according to claim 1, wherein said optical suppression means comprises at least one lens and at least one mirror.

8. The laser illuminator according to claim 1, wherein said optical suppression means comprises a condenser lens and a collimator lens.

9. The laser illuminator according to claim 1, wherein said optical suppression means comprises a condenser mirror and a collimator lens.

10. The laser illuminator according to claim 1, wherein said optical suppression means comprises either a condenser mirror and a collimator lens or a condenser lens and a collimator mirror.

11. The laser illuminator according to claim 1, further comprising a moving means for said optical diffusion means and said optical suppression means or each element means for forming said optical suppression means in at least either one of upper, lower, right, left and parallel directions with respect to said laser beam.

12. The laser illuminator according to claim 1, further comprising a moving means for at least either said optical diffusion means or said optical suppression means.

13. The laser illuminator according to claim 1, wherein said laser illuminator is covered with a light shielding plate or light shielding box.

14. A laser illuminator comprising:
at least one optical diffusion means capable of modifying an optical diffusion condition; and
at least one optical suppression means for suppressing divergence of light, wherein said optical diffusion means and said optical suppression means are disposed along an optical path of a laser beam radiating from a laser source and jointly convert said laser beam into a diffused and non-divergent light beam for illuminating or exciting an object, said optical suppression means comprise a condenser lens and a collimator lens, and said optical diffusion means is an optical diffusion plate capable of modifying an optical diffusion condition and a distance between said optical diffusion plate and the outer circumference of said condenser lens on the side of said optical diffusion plate is within r·cot (θ), (wherein θ represents an optical diffusion angle of said optical diffusion plate and r represents a radius of said condenser lens).

15. The laser illuminator according to claim 14, wherein said optical diffusion angle of said optical diffusion plate is within 30°.

16. The laser illuminator according to claim 14, wherein the radius of said condenser lens is within 20 mm.

17. The laser illuminator according to claim 14, wherein the distance between said optical diffusion plate and the outer circumference of said condenser lens on the side of said optical diffusion plate is at least within 152 mm.

18. The laser illuminator according to claim 14, wherein a diameter of said collimator lens is equal to or larger than that of said condenser lens.

19. The laser illuminator according to claim 14, wherein said collimator lens has either the same focal length as that of said condenser lens or a focal length longer than that of said condenser lens.

20. The laser illuminator according to claim 14, wherein said optical diffusion plate is electromagnetically rotatable.

21. The laser illuminator according to claim 14, wherein said optical diffusion plate is electromagnetically vibratable.

22. A microscope, comprising a laser illuminator, the laser illuminator comprising:
at least one optical diffusion means capable of modifying an optical diffusion condition; and
at least one optical suppression means for suppressing divergence of light, wherein
said optical diffusion means and said optical suppression means are disposed along an optical path of a laser beam radiating from a laser source and jointly convert said laser beam into a diffused and non-divergent light beam for illuminating or exciting an object, and
said optical diffusion means comprises an optical diffusion plate capable of modifying an optical diffusion condition and electromagnetically rotatable, to make a concavo-convex distribution at the surface of the optical diffusion means or a refraction index distribution at the inside of the optical diffusion means be electromagnetically variable.

23. A microscopic spectroscope, comprising a laser illuminator, the laser illuminator comprising:
at least one optical diffusion means capable of modifying an optical diffusion condition; and
at least one optical suppression means for suppressing divergence of light, wherein
said optical diffusion means and said optical suppression means are disposed along an optical path of a laser beam radiating from a laser source and jointly convert said laser beam into a diffused and non-divergent light beam for illuminating or exciting an object, and
said optical diffusion means comprises an optical diffusion plate capable of modifying an optical diffusion condition and electromagnetically rotatable, to make a concavo-convex distribution at the surface of the optical diffusion means or a refraction index distribution at the inside of the optical diffusion means be electromagnetically variable.

24. An optical lithography equipment, comprising a laser illuminator as a light source, the laser illuminator comprising:
at least one optical diffusion means capable of modifying an optical diffusion condition; and
at least one optical suppression means for suppressing divergence of light, wherein
said optical diffusion means and said optical suppression means are disposed along an optical path of a laser beam radiating from a laser source and jointly convert said laser beam into a diffused and non-divergent light beam for illuminating or exciting an object, and
said optical diffusion means comprises an optical diffusion plate capable of modifying an optical diffusion condition and electromagnetically rotatable, to make a concavo-convex distribution at the surface of the optical diffusion means or a refraction index distribution at the inside of the optical diffusion means be electromagnetically variable.

25. A laser illuminator comprising:
at least one optical diffusion means capable of modifying an optical diffusion condition; and
at least one optical suppression means for suppressing divergence of light, wherein
said optical diffusion means and said optical suppression means are disposed along an optical path of a laser beam radiating from a laser source and jointly convert said laser beam into a diffused and non-divergent light beam for illuminating or exciting an object, and
said optical diffusion means comprises an optical diffusion plate capable of modifying an optical diffusion condition and electromagnetically vibratable, to make a concavo-convex distribution at the surface of the optical diffusion means or a refraction index distribution at the inside of the optical diffusion means be electromagnetically variable.

26. The laser illuminator according to claim 25, wherein said optical diffusion plate comprises at least one optical diffusion plate having a thickness distribution.

27. The laser illuminator according to claim 25, wherein said optical diffusion plate comprises at least one optical diffusion plate having a refractive index distribution.

28. The laser illuminator according to claim 25, wherein said optical diffusion plate is at least one holographic optical diffusion plate.

29. The laser illuminator according to claim 25, wherein said optical suppression means comprises at least one lens.

30. The laser illuminator according to claim 25, wherein said optical suppression means comprises at least one mirror.

31. The laser illuminator according to claim 25, wherein said optical suppression means comprises at least one lens and at least one mirror.

32. The laser illuminator according to claim 25, wherein said optical suppression means comprises a condenser lens and a collimator lens.

33. The laser illuminator according to claim 25, wherein said optical suppression means comprises a condenser mirror and a collimator lens.

34. The laser illuminator according to claim 25, wherein said optical suppression means comprises either a condenser mirror and a collimator lens or a condenser lens and a collimator mirror.

35. The laser illuminator according to claim 25, further comprising a moving means for said optical diffusion means and said optical suppression means or each element means for forming said optical suppression means in at least either one of upper, lower, right, left and parallel directions with respect to said laser beam.

36. The laser illuminator according to claim 25, further comprising a moving means for at least either said optical diffusion means or said optical suppression means.

37. The laser illuminator according to claim 25, wherein said laser illuminator is covered with a light shielding plate or light shielding box.

38. A microscope, comprising a laser illuminator, the laser illuminator comprising:
   at least one optical diffusion means capable of modifying an optical diffusion condition; and
   at least one optical suppression means for suppressing divergence of light, wherein
   said optical diffusion means and said optical suppression means are disposed along an optical path of a laser beam radiating from a laser source and jointly convert said laser beam into a diffused and non-divergent light beam for illuminating or exciting an object, and
   said optical diffusion means comprises an optical diffusion plate capable of modifying an optical diffusion condition and electromagnetically vibratable, to make a concavo-convex distribution at the surface of the optical diffusion means or a refraction index distribution at the inside of the optical diffusion means be electromagnetically variable.

39. A microscopic spectroscope, comprising a laser illuminator, the laser illuminator comprising:
   at least one optical diffusion means capable of modifying an optical diffusion condition; and
   at least one optical suppression means for suppressing divergence of light, wherein
   said optical diffusion means and said optical suppression means are disposed along an optical path of a laser beam radiating from a laser source and jointly convert said laser beam into a diffused and non-divergent light beam for illuminating or exciting an object, and
   said optical diffusion means comprises an optical diffusion plate capable of modifying an optical diffusion condition and electromagnetically vibratable, to make a concavo-convex distribution at the surface of the optical diffusion means or a refraction index distribution at the inside of the optical diffusion means be electromagnetically variable.

40. An optical lithography equipment, comprising a laser illuminator as a light source, the laser illuminator comprising:
   at least one optical diffusion means capable of modifying an optical diffusion condition; and
   at least one optical suppression means for suppressing divergence of light, wherein
   said optical diffusion means and said optical suppression means are disposed along an optical path of a laser beam radiating from a laser source and jointly convert said laser beam into a diffused and non-divergent light beam for illuminating or exciting an object, and
   said optical diffusion means comprises an optical diffusion plate capable of modifying an optical diffusion condition and electromagnetically vibratable, to make a concavo-convex distribution at the surface of the optical diffusion means or a refraction index distribution at the inside of the optical diffusion means be electromagnetically variable.

* * * * *